United States Patent
Salminen et al.

(10) Patent No.: US 11,028,348 B2
(45) Date of Patent: Jun. 8, 2021

(54) NATURALLY-DERIVED ANTIMICROBIAL CLEANING SOLUTIONS

(71) Applicant: ProNatural Brands LLC, Victor, NY (US)

(72) Inventors: William Salminen, Sarasota, FL (US); Gary M. Russotti, Boca Raton, FL (US); Richard Aab, Fairport, NY (US); Robert Tuchrelo, Williamson, NY (US); Jeffrey Cahoon, Williamson, NY (US)

(73) Assignee: ProNatural Brands, LLC, Victor, NY (US)

( * ) Notice: Subject to any disclaimer, the term of this patent is extended or adjusted under 35 U.S.C. 154(b) by 59 days.

(21) Appl. No.: 15/938,676

(22) Filed: Mar. 28, 2018

(65) Prior Publication Data
US 2018/0216045 A1 Aug. 2, 2018

Related U.S. Application Data

(63) Continuation-in-part of application No. 14/510,778, filed on Oct. 9, 2014, now Pat. No. 10,076,115.

(51) Int. Cl.
| | | |
|---|---|---|
| *C11D 3/48* | (2006.01) | |
| *C11D 3/20* | (2006.01) | |
| *C11D 11/00* | (2006.01) | |
| *C11D 1/14* | (2006.01) | |
| *A01N 37/36* | (2006.01) | |
| *A01N 25/30* | (2006.01) | |
| *A01N 59/02* | (2006.01) | |
| *A01N 31/02* | (2006.01) | |
| *C11D 3/00* | (2006.01) | |

(52) U.S. Cl.
CPC .............. *C11D 3/48* (2013.01); *A01N 25/30* (2013.01); *A01N 31/02* (2013.01); *A01N 37/36* (2013.01); *A01N 59/02* (2013.01); *C11D 1/146* (2013.01); *C11D 3/0031* (2013.01); *C11D 3/201* (2013.01); *C11D 3/2075* (2013.01); *C11D 3/2079* (2013.01); *C11D 3/2082* (2013.01); *C11D 3/2086* (2013.01); *C11D 11/0017* (2013.01); *C11D 11/0023* (2013.01); *Y02A 50/30* (2018.01)

(58) Field of Classification Search
None
See application file for complete search history.

(56) References Cited

U.S. PATENT DOCUMENTS

| | | | |
|---|---|---|---|
| 4,404,040 A | 9/1983 | Wang | |
| 4,715,980 A | 12/1987 | Lopes et al. | |
| 4,975,217 A | 12/1990 | Brown-Skrobot et al. | |
| 5,143,720 A | 9/1992 | Lopes | |
| 5,280,042 A | 1/1994 | Lopes | |
| 5,330,769 A | 7/1994 | McKinzie et al. | |
| 5,403,587 A | 4/1995 | Mccue et al. | |
| 5,436,008 A | 7/1995 | Richter et al. | |
| 5,460,833 A | 10/1995 | Andrews et al. | |
| 5,490,992 A | 2/1996 | Andrews et al. | |
| 5,705,461 A | 1/1998 | Murch et al. | |
| 5,942,478 A | 8/1999 | Lopes | |
| 6,019,905 A | 2/2000 | Waggoner | |
| 6,071,961 A | 6/2000 | Wider | |
| 6,190,675 B1 * | 2/2001 | Beerse .................. | A61K 8/347 424/401 |
| 6,262,038 B1 | 7/2001 | Pierce et al. | |
| 6,345,634 B1 | 2/2002 | Murch et al. | |
| 6,472,358 B1 | 10/2002 | Richter et al. | |
| 6,553,779 B1 | 4/2003 | Boyer et al. | |
| 6,753,305 B2 | 6/2004 | Raso et al. | |
| 6,846,498 B2 | 1/2005 | DeAth et al. | |
| 6,867,233 B2 | 3/2005 | Roselle et al. | |
| 6,953,772 B2 | 10/2005 | Lopes | |
| 7,090,882 B2 | 8/2006 | Koefod et al. | |
| 7,642,227 B2 | 1/2010 | Kurtz | |
| 7,851,430 B2 | 12/2010 | Kurtz | |
| 8,147,877 B2 | 4/2012 | DeAth et al. | |
| 8,205,460 B2 | 6/2012 | Russo et al. | |
| 10,076,115 B2 | 12/2018 | Salminen et al. | |
| 2002/0132742 A1 | 9/2002 | Mizuki | |
| 2002/0187918 A1 | 12/2002 | Urban | |
| 2009/0004122 A1 | 1/2009 | Modak et al. | |
| 2010/0056416 A1 | 3/2010 | Scheuing et al. | |
| 2010/0136148 A1 | 6/2010 | Saint Victor | |

(Continued)

FOREIGN PATENT DOCUMENTS

| | | |
|---|---|---|
| EP | 0719089 A1 | 7/1996 |
| EP | 1252283 B1 | 7/2007 |

(Continued)

OTHER PUBLICATIONS

U.S. Office Action issued by the U.S. Patent and Trademark Office in regards to U.S. Appl. No. 16/059,307 dated Jun. 24, 2019 (7 pages).
Extended European Search Report 15848915.3, dated Mar. 22, 2018.
International Search Report and Written Opinion of the International Searching Authority in corresponding International Application No. PCT/US2015/051410, completed Dec. 28, 2015 (9 pages).

(Continued)

*Primary Examiner* — Robert A Wax
*Assistant Examiner* — Randeep Singh
(74) *Attorney, Agent, or Firm* — Dinsmore & Shohl LLP

(57) ABSTRACT

Various aspects of the embodiments relate to methods of cleaning and disinfecting with a mixture comprising a cleaning and disinfecting composition concentrate and water. The cleaning and disinfecting composition concentrate typically comprises an organic acid, a surfactant, and an alcohol, and the concentrate typically lacks any halogenated molecule.

17 Claims, No Drawings

(56) References Cited

U.S. PATENT DOCUMENTS

2013/0253059 A1  9/2013 Man et al.
2014/0030203 A1  1/2014 Dombeck

FOREIGN PATENT DOCUMENTS

WO       9609761 A1  4/1996
WO    2014152189 A1  9/2014

OTHER PUBLICATIONS

Zhao et al.: "Inactivation of *Salmonella* and *Escherichia coli* 0157:H7 on Lettuce and Poultry Skin by Combinations of Levulinic Acid and Sodium Dodecyl Sulfate"—Journal of Food Protection, vol. 72, No. 5, 2009; pp. 928-936.
HealthPro Brands: "Fit Antibacterial Fruit & Vegetable Wash"—Oct. 3, 2006 (4 pages).

\* cited by examiner

NATURALLY-DERIVED ANTIMICROBIAL CLEANING SOLUTIONS

PRIORITY CLAIM

This patent application is a Continuation-In-Part of U.S. patent application Ser. No. 14/510,778, filed Oct. 9, 2014, which is hereby incorporated by reference in its entirety.

BACKGROUND

Cleaning and disinfecting compositions frequently include halogenated molecules, oxidizing agents, and other compounds that kill pathogens but that are also harmful to humans, animals, and plants. Halogenated molecules and oxidizing agents can also be harmful to the environment. Nontoxic cleaning and disinfecting compositions that are both effective at killing microbes and environmentally friendly therefore remain desirable.

SUMMARY

Various aspects of the embodiments relate to a method of cleaning a sink, drain, or pipe, comprising contacting the sink, drain, or pipe with a mixture comprising a cleaning and disinfecting composition concentrate and water as described herein.

Various aspects of the embodiments relate to a method of chemically ablating biofilm, comprising contacting the biofilm with a mixture comprising a cleaning and disinfecting composition concentrate and water as described herein. The biofilm can be, for example, a *Pseudomonas aeruginosa*, *Escherichia coli*, *Listeria monocytogenes*, or *Streptococcus* biofilm.

Various aspects of the embodiments relate to a method of laundering fabric, comprising contacting the fabric with a mixture comprising a cleaning and disinfecting composition concentrate and water as described herein. The fabric is typically resistant to the growth of gram-positive bacteria and gram-negative bacteria after contacting the fabric with the mixture relative to an otherwise-identical fabric that is not contacted with the mixture. The method may further comprise ironing the fabric after contacting the fabric with the mixture; washing the fabric prior to contacting the fabric with the mixture; or dry-cleaning the fabric prior to contacting the fabric with the mixture.

Various aspects of the embodiments relate to a method of washing produce, comprising contacting the produce with a mixture comprising a cleaning and disinfecting composition concentrate and water as described herein.

Various aspects of the embodiments relate to a method of cleaning and disinfecting a surface, comprising contacting the surface with a mixture comprising a cleaning and disinfecting composition concentrate and water as described herein. The surface can be, for example, wood, tile, ceramic, porcelain, glass, fabric, leather, carpet, linoleum, laminate, metal, rock, marble, granite, slate, concrete, asphalt, brick, paint, plaster, Styrofoam, plastic, silicone, or rubber, or the surface may comprise two or more of the foregoing.

A cleaning and disinfecting composition concentrate typically comprises, consists essentially of, or consists of organic molecules; monoatomic ions; hydronium; water; optionally one or more carbonates, sulfates, and phosphates; and optionally hydrogen peroxide.

A cleaning and disinfecting composition concentrate typically comprises an organic acid, optionally a fatty acid, a surfactant, an alcohol, and water. A cleaning and disinfecting composition concentrate is typically essentially free of halogenated molecules. A cleaning and disinfecting composition concentrate is typically essentially free of oxidizing agents other than hydrogen peroxide. The pH of a cleaning and disinfecting composition concentrate is typically less than 6.0.

In certain preferred embodiments, each molecule of a concentrate, or an acid or salt thereof, is at least one of (1) Generally Recognized as Safe ("GRAS") as a food additive by the US Food and Drug Administration (FDA); (2) a food additive permitted for direct addition to food for human consumption by the FDA; or (3) an inert ingredient exempt from the requirement of a tolerance by the Environmental Protection Agency (EPA).

A mixture of a cleaning and disinfecting composition concentrate and water as described herein is typically effective at killing both gram-positive bacteria and gram-negative bacteria.

DETAILED DESCRIPTION

Various aspects of the embodiments relate to the finding that cleaning and disinfecting compositions comprising an organic acid, a surfactant, and an alcohol are effective at killing a wide range of pathogens in a variety of different methods. Such compositions can be manufactured using solely organic molecules and environmentally-friendly salts of carbonates, sulfates, phosphates, and monoatomic ions. Various aspects of the embodiments therefore relate to methods of using compositions that (a) lack both halogenated molecules and oxidizing agents other than hydrogen peroxide and (b) are nevertheless effective at killing both gram-positive bacteria and gram-negative bacteria in addition to other types of microbes and pathogens. Various aspects of the embodiments also relate to methods of using compositions that consist of molecules and monoatomic ions that (a) are either Generally Recognized as Safe ("GRAS") or otherwise permitted food additives (e.g., as recognized by governmental agencies) and (b) are nevertheless effective at killing both gram-positive bacteria and gram-negative bacteria in addition to other types of microbes and pathogens.

I. Cleaning and Disinfecting Composition Concentrate

Various aspects of the invention relate to a cleaning and disinfecting composition concentrate ("concentrate"). The concentrate typically comprises an organic acid, a surfactant, and an alcohol.

In certain preferred embodiments, the concentrate consists essentially of organic molecules, monoatomic ions, hydronium, water, and optionally one or more carbonates, sulfates, and/or phosphates. The organic acid, surfactant, and alcohol are typically organic molecules. The term "organic molecule" as used herein refers to a molecule consisting of (a) carbon, (b) hydrogen, and (c) optionally one or more of oxygen, nitrogen, sulfur, and/or phosphorous. An organic molecule contains at least one carbon-hydrogen bond, e.g., formic acid is an organic molecule and carbonic acid is not an organic molecule as the term "organic molecule" is defined herein. An organic molecule lacks elements other than carbon, hydrogen, oxygen, nitrogen, sulfur, and/or phosphorous as the term "organic molecule" is defined herein.

The concentrate is preferably essentially free of halogenated molecules. Halogenated molecules are not organic molecules as the term "organic molecule" is defined herein. Halogenated molecules include chlorinated molecules such as hypochlorite, dichloroisocyanuric acid (troclosene), trichloroisocyanuric acid, triclosan, and triclocarban. In some embodiments, the concentrate lacks halogenated molecules. In some embodiments, the concentrate lacks elemental iodine or triiodide. In some embodiments, the concentrate is essentially free of or lacks elemental chlorine. In some embodiments, the concentrate is essentially free of bromide.

In preferred embodiments, the concentrate lacks ammonium cation, primary ammonium cation, secondary ammonium cation, tertiary ammonium cation, and/or quaternary ammonium cation. In preferred embodiments, the concentrate lacks monoethanolamine. In preferred embodiments, the concentrate lacks 2-butoxyethanol. In preferred embodiments, the concentrate lacks coal tar dye. In certain embodiments, the concentrate is essentially free of phosphates.

In certain preferred embodiments, each molecule in the concentrate, or an acid or salt thereof, is either (a) Generally Recognized as Safe ("GRAS") as a food additive (e.g., by the US Food and Drug Administration) or (b) a food additive permitted for direct addition to food for human consumption by national law such as by the US Food and Drug Administration. GRAS or permitted food additive status provides evidence that the components of a concentrate are relatively non-toxic, e.g., such that any residual concentrate that remains on a surface after use of a concentrate is unlikely to be harmful to humans. The fact that a molecule may not exist in a concentrate as the specific acid or salt defined either as GRAS or as a permitted food additive, or at a permitted concentration, is irrelevant so long as at least one acid or salt form of the molecule is GRAS or a permitted food additive. For example, a concentrate may be prepared using sodium bisulfate, which is GRAS under Title 21 Section 182.3739 of the US Code of Federal Regulations. Sulfuric acid is GRAS under Title 21 Section 184.1095, which provides a second, independent basis for finding that bisulfate is GRAS because sulfuric acid is the acid form of bisulfate. In some embodiments, the terms GRAS and "permitted food additive" refer to compounds listed in one or more of Title 21 Parts 172-178 and 180-186 of the US Code of Federal Regulations as updated on Apr. 1, 2017 (21 C.F.R. § 172.105-186.1839 (2017), herein incorporated by reference in its entirety). For example, the molecules present in a concentrate may be selected from those listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184, and the ions, acids, and alternate salt forms of those listed. Similarly, the organic molecules present in a concentrate may be selected from the organic molecules listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184, and ions, acids, and alternate salt forms of those listed.

In certain preferred embodiments, each molecule in the concentrate, or an acid or salt thereof, is an inert ingredient exempt from the requirement of a tolerance by the Environmental Protection Agency (EPA). For example, the molecules present in a concentrate may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety), and the ions, acids, and alternate salt forms of those listed. The molecules present in a concentrate may be selected from those listed as inert ingredients in Title 40 Part 180.910-180.960 of the US Code of Federal Regulations as updated on Jul. 1, 2012, preferably Part 180.910, and the ions, acids, and alternate salt forms of those listed. Similarly, the organic molecules present in a concentrate may be selected from the organic molecules listed as inert ingredients in Title 40 Part 180.910-180.960 of the US Code of Federal Regulations as updated on Jul. 1, 2012, preferably Part 180.910, and the ions, acids, and alternate salt forms of those listed.

A. Organic Acid

The organic acid is preferably a carboxylic acid or enediol or a carboxylate or enolate thereof. The organic acid preferably consists of carbon, oxygen, and hydrogen. For example, the organic acid may be selected from citric acid, acetic acid, ascorbic acid, aconitic acid, adipic acid, fumaric acid, propionic acid, succinic acid, oxalic acid, lactic acid, malic acid, benzoic acid, and carbonic acid. In certain preferred embodiments, the organic acid is citric acid, acetic acid, or ascorbic acid.

A concentrate preferably comprises organic acid at a concentration of about 10% to about 40% (w/v), such as about 15% to about 35%, about 20% to about 32%, about 10% to about 30%, about 20% to about 40%, about 10% to about 20%, about 15% to about 25%, about 20% to about 30%, about 25% to about 35%, about 30% to about 40%, about 15% to about 20%, about 17% to about 22%, about 20% to about 25%, about 22% to about 27%, about 25% to about 30%, about 27% to about 32%, or about 30% to about 35%. The term "concentration" used in relation to an organic acid refers to all organic acid in a concentrate and all conjugate base thereof except that the term "concentration" does not include fatty acid or conjugate base thereof for concentrates that include both an organic acid and a fatty acid. For example, a concentrate comprising 20% citric acid, 10% citrate, 8% ascorbic acid, 4% ascorbate, 15% oleic acid, and 5% oleate comprises 42% organic acid (20% citric acid plus 10% citrate plus 8% ascorbic acid plus 4% ascorbate) and not 62% organic acid because the oleic acid and its conjugate base oleate are classified as fatty acids and not organic acids for the determination of the concentration of organic acid.

Concentrates can optionally be prepared with higher organic acid concentrations and then diluted. In some embodiments, a concentrate comprises organic acid at a concentration of at least about 10% such as at least about 15%, 20%, 25%, or 30%.

In certain preferred embodiments, the organic acid or a salt thereof is either GRAS or a permitted food additive under national law. Title 21 Part 184(B) of the US Code of Federal Regulations, for example, states that acetic acid, citric acid, and ferrous ascorbate are GRAS when used in accordance with a number of different conditions. The fact that a specific organic acid is GRAS at least in some circumstances conforms to the feature "the organic acid or a salt thereof is GRAS," even if the organic acid is not used in a concentrate or mixture thereof under conditions that are GRAS. Similarly, the fact that a specific organic acid is GRAS conforms to the feature "the organic acid or a salt thereof is GRAS" even if a concentrate or mixture thereof is prepared using a salt of the organic acid. Similarly, the fact that a specific salt of an organic acid is GRAS (e.g., ferrous ascorbate) conforms to the feature "the organic acid or a salt thereof is GRAS" even if a concentrate or mixture thereof is prepared using an organic acid (e.g., ascorbic acid) or salt thereof that is not the specific GRAS salt form. The purpose of using a GRAS organic acid in accordance with the foregoing is that a mixture comprising a concentrate and water may be used, for example, on food, clothing, and surfaces that come into contact with humans and animals without risking significant harm. The organic acid may be selected from the organic acids and salts thereof listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the organic acid or a salt thereof is an inert ingredient exempt from the requirement of a tolerance by the EPA. For example, the organic acid or a salt thereof may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The organic acid or a salt thereof may be selected from those listed as inert ingredients in Title 40 Part 180.910-180.960 of the US Code of Federal Regulations as updated on Jul. 1, 2012, preferably Part 180.910.

B. Fatty Acid

A concentrate optionally comprises a fatty acid. The fatty acid is a carboxylic acid, preferably a monocarboxylic acid, consisting of carbon, hydrogen, and oxygen, or a carboxylate thereof. A fatty acid may be saturated (e.g., lauric acid, capric acid, caprylic acid, and stearic acid) or unsaturated (e.g., oleic acid, linoleic acid, and sorbic acid). A fatty acid typically comprises a C6-C22 carbon chain such as a C6-C18 carbon chain, although chain length is not particularly limiting. In certain preferred embodiments, the fatty acid is selected from capric acid, lauric acid, stearic acid, oleic acid, and sorbic acid. Sorbic acid, for example, comprises a C6 carbon chain, capric acid comprises a C10 carbon chain; lauric acid comprises a C12 carbon chain, and stearic acid and oleic acid comprise C18 carbon chains. The term "fatty acid" as used herein refers to a carboxylic acid present in a concentrate in addition to the requisite organic acid. In different embodiments, the same molecule can be either an organic acid or a fatty acid. For example, a first concentrate may comprise the C6 carboxylic acid caproic acid and lack any other organic acid, in which case caproic acid is an organic acid and not a fatty acid; and, a second concentrate may comprise caproic acid and 20% citric acid, in which case caproic acid is a fatty acid and citric acid is an organic acid.

A concentrate preferably comprises fatty acid at a concentration of 0% to about 5% (w/v), such as 0% to about 3%, about 0.2% to about 3%, about 0.2% to about 1.0%, about 0.5% to about 1.5%, about 1.0% to about 2%, about 1.5% to about 2.5%, or about 2.0% to about 3%. Concentrates can optionally be prepared with higher fatty acid concentrations and then diluted. In some embodiments, a concentrate comprises fatty acid at a concentration of at least about 0.2% such as at least about 0.5%, 1.0%, 1.5%, or 2.0%.

In certain preferred embodiments, the fatty acid or a salt thereof is either GRAS or a permitted food additive under national law. Title 21 Section 172.860 of the US Code of Federal Regulations, for example, states that capric acid, caprylic acid, lauric acid, myristic acid, oleic acid, palmitic acid, and stearic acid may be safely used in food and in the manufacture of food components in accordance with a number of different conditions. The fact that a specific fatty acid is GRAS at least in some circumstances conforms to the feature "the fatty acid or a salt thereof is GRAS," even if the fatty acid is not used in a concentrate or mixture thereof under conditions that are GRAS. Similarly, the fact that a specific fatty acid is GRAS conforms to the feature "the fatty acid or a salt thereof is GRAS" even if a concentrate or mixture thereof is prepared using a salt of the fatty acid. Similarly, the fact that a specific salt of a fatty acid is GRAS conforms to the feature "the fatty acid or a salt thereof is GRAS" even if a concentrate or mixture thereof is prepared using a fatty acid or salt thereof that is not the specific GRAS salt form. The purpose of using a GRAS fatty acid in accordance with the foregoing is that a mixture comprising a concentrate and water may be used, for example, on food, clothing, and surfaces that come into contact with humans and animals without risking significant harm. The fatty acid may be selected from the fatty acids and salts thereof listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the fatty acid or a salt thereof is an inert ingredient exempt from the requirement of a tolerance by the EPA. For example, the fatty acid or a salt thereof may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The organic acid or a salt thereof may be selected from those listed as inert ingredients in Title 40 Part 180.910-180.960 of the US Code of Federal Regulations as updated on Jul. 1, 2012, preferably Part 180.910.

C. Surfactant

The surfactant is typically an anionic surfactant. For example, the surfactant can be an organosulfate, sulfonate, organophosphate, organophosphonate, or carboxylate. In certain preferred embodiments, the surfactant is lauryl sulfate. The counterion of the surfactant is not particularly limiting and may be selected, for example, from metal cations such as potassium, magnesium, sodium, or lithium ion. Lauryl sulfate is also used industrially as an ammonium or triethanolamine salt, and various concentrates may include either ammonium or triethanolamine as a counterion of the surfactant.

A concentrate typically comprises surfactant at a concentration of about 1% to about 50% (w/v), such as about 2% to about 40%, about 3% to about 35%, about 4% to about 34%, about 5% to about 15%, about 10% to about 20%, about 15% to about 25%, about 20% to about 30%, about 25% to about 35%, about 2% to about 7%, about 5% to about 10%, about 7% to about 12%, about 10% to about 15%, about 12% to about 17%, about 15% to about 20%, about 17% to about 22%, about 20% to about 25%, about 22% to about 27%, about 25% to about 30%, about 27% to about 32%, about 30% to about 35%, or about 32% to about 37%. Concentrates can optionally be prepared with higher surfactant concentrations and then diluted. In some embodiments, a concentrate comprises surfactant at a concentration of at least about 5% such as at least about 10%, 15%, 20%, 25%, or 30%.

In certain preferred embodiments, the surfactant or a salt thereof is either GRAS or a permitted food additive under national law. Title 21 section 172.822 of the US Code of Federal Regulations, for example, states that sodium lauryl sulfate may be safely used in food in accordance with a number of different conditions. The fact that sodium lauryl sulfate is a permitted food additive at least in some circumstances conforms to the feature "lauryl sulfate or a salt thereof is a permitted food additive," even though lauryl sulfate is not used in a concentrate or mixture thereof under conditions that are permitted. Similarly, the fact that sodium lauryl sulfate is a permitted food additive conforms to the feature "lauryl sulfate or a salt thereof is a permitted food additive" even if a concentrate or mixture thereof is prepared using a salt of lauryl sulfate other than the sodium salt. The purpose of using a surfactant in accordance with the foregoing is that a mixture comprising a concentrate and water may be used, for example, on food, clothing, and surfaces that come into contact with humans and animals without risking significant harm. The surfactant may be selected from the surfactants and acids and salts thereof listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the surfactant or a salt thereof is an inert ingredient exempt from the requirement of a tolerance by the EPA. For example, the surfactant or a salt thereof may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The surfactant or a salt thereof may be selected from those listed as inert ingredients in Title 40 Part 180.910-180.960 of the US Code of Federal Regulations as updated on Jul. 1, 2012, preferably Part 180.910.

D. Alcohol

The alcohol is a molecule consisting of carbon, hydrogen, and oxygen, which contains an alcohol group and lacks a carboxyl group. In some embodiments, the alcohol is an open-chain, saturated compound. The alcohol preferably lacks an electrostatic charge and lacks a functional group that is ionizable at pH 1-10. In certain embodiments, the alcohol contains only $sp^3$-hybridized carbons. In certain preferred embodiments, the alcohol is ethanol or n-propanol.

A concentrate typically comprises alcohol at a concentration of about 1% to about 20% (w/v), such as about 2% to about 10%, about 2.5% to about 7.5%, about 2% to about 4%, about 3% to about 5%, about 4% to about 6%, or about 5% to about 7%. Concentrates can optionally be prepared with higher alcohol concentrations and then diluted. In some embodiments, a concentrate comprises alcohol at a concentration of at least about 1% such as at least about 2%, 3%, 4%, 5%, or 6%.

In certain embodiments, the alcohol is either GRAS or a permitted food additive under national law. Title 21 section 184.1293 of the US Code of Federal Regulations, for example, states that ethanol is GRAS. The alcohol may be selected from the alcohols listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the alcohol is an inert ingredient exempt from the requirement of a tolerance by the EPA. For example, the alcohol may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The alcohol may be selected from those listed as inert ingredients in Title 40 Part 180.910-180.960 of the US Code of Federal Regulations as updated on Jul. 1, 2012, preferably Part 180.910.

E. Pesticide

A concentrate optionally comprises a pesticide. A pesticide is preferably an organic compound. A pesticide may be a molecule that consist essentially of two or more of carbon, hydrogen, oxygen, nitrogen, sulfur, and phosphorous. In certain preferred embodiments, the pesticide is a molecule that consists of carbon, hydrogen, and oxygen such as phenethyl propionate.

A concentrate comprising a pesticide typically includes the pesticide at a concentration of about 0.5% to about 5% such as about 1% to about 3%. Concentrates can optionally be prepared with higher pesticide concentrations and then diluted. In some embodiments, a concentrate comprises pesticide at a concentration of at least about 0.5% such as at least about 1% or 2%.

In certain embodiments, the pesticide is either GRAS or a permitted food additive under national law. Title 21 section 172.515 of the US Code of Federal Regulations, for example, defines phenethyl propionate as a food additive permitted for direct addition to food for human consumption provided that certain conditions are met. The pesticide may be selected from the molecules and acids and salts thereof listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the pesticide is an inert ingredient exempt from the requirement of a tolerance by the EPA. For example, the pesticide may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The pesticide may be selected from those listed as inert ingredients in Title 40 Part 180.910-180.960 of the US Code of Federal Regulations as updated on Jul. 1, 2012, preferably Part 180.910.

F. Inorganic Anions

A concentrate optionally comprises inorganic anions. Inorganic anions including fluoride, chloride, bromide, nitrite, nitrate, phosphate, sulfate, bicarbonate, and carbonate are ubiquitous in water supplies at concentrations typically less than 0.1% each. A concentrate may optionally comprise inorganic anions from a water supply at concentrations that correspond to the relative proportion of water from the water supply in the concentrate. A concentrate may similarly optionally comprise trace inorganic anions from other components of the concentrate that correspond to the relative proportion of the components in the concentrate.

A concentrate may comprise sulfate, bisulfate, carbonate, bicarbonate, phosphate, pyrophosphate, tripolyphosphate, and protonated forms of any of the foregoing.

A concentrate may comprise sulfate and/or bisulfate at a concentration of about 0.5% to about 10% (w/v), such as about 1% to about 7%, about 1% to about 3%, about 2% to about 4%, about 3% to about 5%, about 4% to about 6%, or about 5% to about 7%.

A concentrate may comprise carbonate and/or bicarbonate at a concentration of about 0.5% to about 10% (w/v), such as about 1% to about 7%, about 1% to about 3%, about 2% to about 4%, about 3% to about 5%, about 4% to about 6%, or about 5% to about 7%.

A concentrate may comprise phosphate, pyrophosphate, tripolyphosphate, and/or protonated forms of phosphate, pyrophosphate, and/or tripolyphosphate at a concentration of about 0.5% to about 10% (w/v), such as about 1% to about 7%, about 1% to about 3%, about 2% to about 4%, about 3% to about 5%, about 4% to about 6%, or about 5% to about 7%.

Carbonates, sulfates, and phosphates in plural forms and generic forms (e.g., a carbonate, a sulfate, and a phosphate) as used herein are anions that exist in stable oxidation states and consist of (a) either carbon, sulfur, or phosphate, respectively, (b) oxygen, and (c) optionally hydrogen. Carbonates include carbonic acid, bicarbonate, and carbonate as the term "carbonates" is defined. Sulfates include sulfuric acid, bisulfate, and sulfate as the term "sulfates" is defined. Phosphates include phosphoric acid, dihydrogen phosphate, hydrogen phosphate, phosphate, pyrophosphate, tripolyphosphate, and the various protonated forms of pyrophosphate and tripolyphosphate as the term "phosphates" is defined. The terms carbonate, sulfate, and phosphate in the singular and without an indefinite article (e.g., "a") refer to the discrete molecular species carbonate, sulfate, and phosphate, i.e., $CO_3^{-2}$, $SO_4^{-2}$, $PO_4^{-3}$. One of ordinary skill in the art will immediately recognize, however, that a liquid concentrate comprising "sodium carbonate" or "sodium sulfate," will actually comprise sodium cation and either (a) carbonate and bicarbonate or (b) sulfate and bisulfate, respectively, depending upon the pH of the concentrate. A concentrate comprising 2% sulfate, for example, therefore includes concentrates at various pH's comprising various ratios of sulfate to bisulfate wherein the sum of the total sulfates in the concentrate is about 2%.

A concentrate may comprise sulfates at a concentration of about 0.5% to about 10% (w/v), such as about 1% to about 7%, about 1% to about 3%, about 2% to about 4%, about 3% to about 5%, about 4% to about 6%, or about 5% to about 7%.

A concentrate may comprise carbonates at a concentration of about 0.5% to about 10% (w/v), such as about 1% to about 7%, about 1% to about 3%, about 2% to about 4%, about 3% to about 5%, about 4% to about 6%, or about 5% to about 7%.

A concentrate may comprise phosphates at a concentration of about 0.5% to about 10% (w/v), such as about 1% to about 7%, about 1% to about 3%, about 2% to about 4%, about 3% to about 5%, about 4% to about 6%, or about 5% to about 7%.

A concentrate can lack halogenated molecules and nevertheless comprise fluoride, chloride, and/or bromide because fluoride, chloride, and bromide are monoatomic ions, which are not molecules by definition.

Inorganic anions may be selected from anions present in salts listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

Inorganic anions may be selected from anions present in salts listed as inert ingredients exempt from the requirement of a tolerance by the EPA. For example, the inorganic anions may be selected from anions present in salts listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The inorganic anions may be selected from anions present in salts listed as inert ingredients in Title 40 Part 180.910-180.960 of the US Code of Federal Regulations as updated on Jul. 1, 2012, preferably Part 180.910.

G. Inorganic Cations

A concentrate optionally comprises inorganic cations. Inorganic cations including sodium, potassium, calcium, magnesium, iron, and strontium are ubiquitous in water supplies at concentrations typically less than 0.1% each. A concentrate may optionally comprise inorganic cations from a water supply at concentrations that correspond to the relative proportion of water from the water supply in the concentrate. A concentrate may similarly optionally comprise trace inorganic cations from other components of the concentrate that correspond to the relative proportion of the components in the concentrate.

A concentrate optionally comprises metal cations such as sodium, potassium, magnesium, lithium, and/or calcium, which are typically present as counterions. For example, lauryl sulfate typically exists in the presence of a metal cation such as sodium. The species of inorganic cation(s) that are present as counterion(s) in a concentrate is not particularly limiting.

Inorganic cations may be selected from cations present in salts listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

Inorganic cations may be selected from cations present in salts listed as inert ingredients exempt from the requirement of a tolerance by the EPA. For example, the inorganic cations may be selected from cations present in salts listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The inorganic cations may be selected from cations present in salts listed as inert ingredients in Title 40 Part 180.910-180.960 of the US Code of Federal Regulations as updated on Jul. 1, 2012, preferably Part 180.910.

H. Hydrogen Peroxide

A concentrate optionally comprises hydrogen peroxide. A concentrate may comprise hydrogen peroxide, for example, at a concentration of about 1% to about 10% (w/v), such as about 3% to about 8%, about 1% to about 3%, about 2% to about 4%, about 3% to about 5%, about 4% to about 6%, about 5% to about 7%, about 6% to about 8%, about 7% to about 9%, or about 8% to about 10%.

In some embodiments, the concentrate is essentially free of oxidizing and reducing agents other than the oxidizing agent hydrogen peroxide. In some embodiments, the concentrate is essentially free of any oxidizing or reducing agent including the oxidizing agent hydrogen peroxide.

In some embodiments, the concentrate lacks oxidizing and reducing agents other than the oxidizing agent hydrogen peroxide. In some embodiments, the concentrate lacks any oxidizing or reducing agent including the oxidizing agent hydrogen peroxide.

Title 21 section 184.1366 of the US Code of Federal Regulations, for example, defines hydrogen peroxide as GRAS provided that certain conditions are met.

I. Essential Oil

A concentrate optionally comprises an essential oil. The term "essential oil" as used herein refers to a hydrophobic organic molecule or a plurality of hydrophobic organic molecules that are pressed, extracted, or distilled from plant material. Essential oils include, for example, d-limonene, vanillin, orange oil, and cinnamon oil. An essential oil according to the embodiments typically is or comprises a molecule that is volatile at room temperature and fragrant.

A concentrate may comprise an essential oil at a concentration of about 0.2% to about 5% (w/v), such as about 0.2% to about 1.0%, about 0.5% to about 1.5%, about 1.0% to about 2.0%, about 1.5% to about 2.5%, about 2.0% to about 3.0%, about 2.5% to about 3.5%, about 3.0% to about 4.0%, about 3.5% to about 4.5%, about 4.0% to about 5.0%, about 0.2% to about 0.7%, about 0.5% to about 1.0%, about 0.7% to about 1.2%, about 1.0% to about 1.5%, about 1.2% to about 1.7%, about 1.5% to about 2.0%, about 1.7% to about 2.2%, about 2.0% to about 2.5%, about 2.2% to about 2.7%, about 2.5% to about 3.0%, or about 2.7% to about 3.2%.

In certain embodiments, the essential oil is either GRAS or a permitted food additive under national law. Essential oils may be selected from molecules and acids and salts thereof listed as (a) GRAS and/or as (b) permitted food additives in Title 21 Parts 172, 173, 178, 181, 182, 184, and 186 of the US Code of Federal Regulations as updated on Apr. 1, 2017, preferably Parts 172, 182, and 184.

In certain preferred embodiments, the essential oil is an inert ingredient exempt from the requirement of a tolerance by the EPA. For example, the essential oil may be selected from those listed as inert ingredients in Title 40 Part 180 Subpart D of the US Code of Federal Regulations as updated on Jul. 1, 2012 (40 C.F.R. § 180.900-180.1314 (2012), herein incorporated by reference in its entirety). The essential oil may be selected from those listed as inert ingredients in Title 40 Part 180.910-180.960 of the US Code of Federal Regulations as updated on Jul. 1, 2012, preferably Part 180.910.

J. Other Organic Molecules

Various other organic molecules may be included in the concentrates described herein, which may optionally also be organic acids, alcohols, fatty acids, and/or surfactants as the terms are defined herein. Ethylenediaminetetraacetate ("EDTA"), for example, may be added to a concentrate as a metal chelating agent. EDTA is the conjugate base of the aminopolycarboxylic acid ethylenediaminetetraacetic acid, and EDTA could be an organic acid as the term is used herein. A concentrate typically does not include EDTA or similar chelating agents, however, at sufficient concentrations to act as an organic acid, e.g., EDTA is typically present at a concentration of about 1-5% in a concentrate, which is substantially lower than the concentration of organic acid that is typically present in a concentrate. Whether or not an organic molecule meets the criteria of an organic acid, alcohol, fatty acid, or surfactant therefore depends on context.

In certain embodiments, a concentrate consists essentially of organic molecules, monoatomic ions, hydronium, water, optionally hydrogen peroxide, and optionally one or more carbonates, sulfates, and phosphates. In certain embodiments, a concentrate consists essentially of organic acid, optionally fatty acid, surfactant, alcohol, monoatomic ions, hydronium, water, optionally hydrogen peroxide, and optionally one or more carbonates, sulfates, and phosphates, and the concentrate is essentially free of organic molecules that are not organic acid, fatty acid, surfactant, or alcohol.

In certain embodiments, a concentrate consists of organic molecules, monoatomic ions, hydronium, water, optionally hydrogen peroxide, and optionally one or more carbonates, sulfates, and phosphates. In certain embodiments, a concentrate consists of organic acid, optionally fatty acid, surfactant, alcohol, monoatomic ions, hydronium, water, optionally hydrogen peroxide, and optionally one or more carbonates, sulfates, and phosphates; and the concentrate lacks organic molecules that are not organic acid, fatty acid, surfactant, or alcohol.

The concentrate is preferably essentially free of any toxins, drugs, or drug-like molecules. In some embodiments, the concentrate is essentially free of any heterocycles. In some embodiments, the concentrate is essentially free of any heterocycles other than ascorbic acid and/or heterocycles found in essential oils. In some embodiments, the concentrate is essentially free of any homocycles. In some embodiments, the concentrate is essentially free of any homocycles other than homocycles found in essential oils. In some embodiments, the concentrate is essentially free of any aromatic hydrocarbons. In some embodiments, the concentrate is essentially free of any aromatic hydrocarbons other than aromatic hydrocarbons found in essential oils. In some embodiments, the concentrate is essentially free of any unsaturated hydrocarbons. In some embodiments, the concentrate is essentially free of any unsaturated hydrocarbons other than ascorbic acid, unsaturated fatty acid(s), and/or unsaturated hydrocarbons found in essential oils. In some embodiments, the concentrate is essentially free of organic molecules that contain any two of nitrogen, sulfur, and phosphorous. In some embodiments, the concentrate is essentially free of any organic molecules that contain nitrogen or phosphorous.

In certain embodiments, the concentrate is essentially free of molecules that are (1) not GRAS, (2) not permitted food additives (e.g., as promulgated by the US Food and Drug Administration), (3) do not have acids or salt forms that are GRAS, and (4) do not have acids or salt forms that are permitted food additives. In certain preferred embodiments, the concentrate is essentially free of molecules that are not exempt from the requirement of a tolerance by the EPA.

K. pH and Buffer

In various embodiments, the pH of a concentrate is about 0 to about 6, such as about 1 to about 6, about 1 to about 5, about 0 to about 4, about 1 to about 4, about 2 to about 4, or about 1 to about 3. In some embodiments, the pH of the concentrate is less than about 6, such as less than about 5, or less than about 4.

In various embodiments, the pH of the concentrate is not more than about 1 pH unit higher than a pKa of the organic acid. In some embodiments, the pH of the concentrate is not more than about 1 pH unit higher than pKa1 of the organic acid, e.g., for organic acids having multiple carboxyl groups. For example, the standard pKa's of citric acid are pKa1=3.1, pKa2=4.8, and pKa3=6.4, and a pH of not more than about 1 pH unit higher than pKa1 of citric acid is a pH of not more than about 4.1 (i.e., 3.1+1.0=4.1).

In various embodiments, the pH of the concentrate is not more than about a pKa of the organic acid. In some embodiments, the pH of the concentrate is not more than about the pKa1 of the organic acid, e.g., for organic acids having multiple carboxyl groups. For example, a pH of not more than about pKa1 of citric acid is a pH of not more than about 3.13.

In some embodiments, the concentrate comprises sulfate and/or bisulfate, and the pH of the concentrate is not more than about 1 pH unit higher than the pKa of bisulfate (e.g., the pH is not more than about 2.99, which is 1 pH unit higher than the standard pKa of bisulfate). In some embodiments, the concentrate comprises sulfate and/or bisulfate, and the pH of the concentrate is not more than the pKa of bisulfate.

In some embodiments, the concentrate comprises carbonate and/or bicarbonate, and the pH of the concentrate is not more than about 1 pH unit higher than the pKa of carbonic acid. In some embodiments, the concentrate comprises carbonate and/or bicarbonate, and the pH of the concentrate is not more than the pKa of carbonic acid.

In some embodiments, the concentrate comprises phosphate, hydrogen phosphate, and/or dihydrogen phosphate, and the pH of the concentrate is not more than about 1 pH unit higher than the pKa of phosphoric acid. In some embodiments, the concentrate comprises hydrogen phosphate and/or dihydrogen phosphate, and the pH of the concentrate is not more than the pKa of phosphoric acid.

In some embodiments, the concentrate comprises a sulfate, carbonate, or phosphate as the terms are defined herein, and the pH of the concentrate is not more than about 1 pH unit higher than a pKa of the sulfate, carbonate, or phosphate (e.g., pKa1 or pKa2). In some embodiments, the concentrate comprises a sulfate, carbonate, or phosphate as the terms are defined herein, and the pH of the concentrate is not more than a pKa of the sulfate, carbonate, or phosphate (e.g., pKa1 or pKa2).

In some embodiments, the ionic strength of the concentrate is about 0.1 to about 5.0, such as about 0.2 to about 4.0, about 0.3 to about 3.0, about 0.4 to about 2.0, about 0.5 to about 1.0, or about 0.7 to about 1.2. In some embodiments, the ionic strength of the concentrate is at least about 0.1, 0.2, 0.3, 0.4, 0.5, 0.6, or 0.7.

In some embodiments, the buffer capacity of the concentrate is about 0.1 to about 2.0 M/pH at the pH of the concentrate such as about 0.2 to about 1.5, about 0.4 to about 1.0, or about 0.5 to about 0.9 M/pH. In some embodiments, the buffer capacity of the concentrate is at least about 0.1, 0.2, 0.3, 0.4, or 0.5 M/pH at the pH of the concentrate.

In some embodiments, the buffer strength of the concentrate is about 0.1 to about 2.0 such as about 0.2 to about 1.5, about 0.4 to about 1.0, or about 0.5 to about 0.9. In some embodiments, the buffer strength of the concentrate is at least about 0.1, 0.2, 0.3, 0.4, or 0.5.

In some embodiments, the carboxylate to buffer cation ratio of the concentrate is about 20:1 to about 1:2, such as about 10:1 to about 1:1 or about 5:1 to about 2:1. In some embodiments, the carboxylate to buffer cation ratio of the concentrate is at least about 1:2, such as at least about 1:1 or at least about 2:1.

In some embodiments, the buffer cation to sulfate ratio is at least about 1:1.

In some embodiments, the concentrate is a liquid, and the total solute in the concentrate is at least about 300 g/L, such as at least about 350, 400, 450, 500, 550, 600, or 650 g/L. In some embodiments, the concentrate is a liquid, and the total solute in the concentrate is about 300 g/L to about 800 g/L such as about 400 g/L to about 750 g/L or about 500 g/L to about 700 g/L.

L. Example Formulation

Numerous similarly-effective concentrates can be prepared according to the foregoing disclosure, and one of ordinary skill in the art could readily prepare each concentrate falling within the scope of "a concentrate consisting essentially of organic molecules, monoatomic ions, hydronium, water, optionally hydrogen peroxide, and optionally one or more carbonates, sulfates, and phosphates, wherein the concentrate comprises an organic acid, surfactant, and alcohol." A particularly preferred embodiment follows, and the various embodiments disclosed herein relate to a concentrate either comprising or consisting essentially of the following components at a pH of about 1.0 to about 5.0:

Organic Acid: Citric Acid; Citrate; Acetic Acid; Acetate; Ascorbic Acid; and/or Ascorbate at about 20% to about 32%;
Fatty Acid: Optionally Capric Acid; Caprate; Lauric Acid; Laurate; Oleic Acid and/or Oleate at about 1% to about 3%,
Surfactant: Lauryl Sulfate at about 5% to about 34%;
Alcohol: Ethanol or n-propanol at about 2% to about 7%;
Pesticide: Optionally an organic molecule that is a pesticide at about 0.5% to about 5.0%, e.g., Phenethyl Propionate at about 1% to about 3%;
Oxidizing Agent: Optionally Hydrogen Peroxide at about 1% to about 10%;
Essential Oil: Optionally d-Limonene; Vanillin; Orange Oil, and/or Cinnamon Oil at about 0.2% to about 4.0%
Other Organic Molecules: Optionally EDTA at about 1% to about 5%
Sulfates: Optionally Sulfate and/or Bisulfate at about 1% to about 6%;
Carbonates: Optionally Carbonate and/or Bicarbonate at about 0.2% to about 6%;
Phosphates: Optionally Phosphate; Pyrophosphate: Tripolyphosphate; and/or protonated forms of any of the foregoing at about 1% to about 7%;
Monoatomic Ions (intentional counterions): Sodium; Potassium; Lithium; Calcium; and/or Magnesium (including the counterion(s) of the surfactant and any sulfate, carbonate, or phosphate);
Water;
Common Trace Monoatomic Ion Impurities: Sodium; Potassium; Calcium; Magnesium; Iron; Strontium; Fluoride; Chloride; and/or Bromide;
Common Trace Inorganic Ion Impurities: Nitrite; Nitrate; Phosphate; Sulfate; Bicarbonate; Carbonate.

The nature of the organic acid, fatty acid, surfactant, alcohol, essential oil, sulfates, carbonates, phosphates, pesticides, monoatomic ions, and impurities are not particularly limiting and may be substituted as set forth in the instant disclosure. The ranges of concentrations and species of molecule can similarly be substituted or narrowed as set forth in the disclosure. The foregoing embodiment nevertheless sets forth a range of concentrates that is generally-effective in the methods described herein. Specifically, concentrates comprising ingredients falling within the specified ranges set forth in the foregoing embodiment will display a broad range of activity against microbes and pathogens including both gram-positive bacteria and gram-negative bacteria in the methods disclosed herein (e.g., in the Exemplification section, infra) without requiring additional antimicrobial agents such as halogenated molecules or oxidizing agents other than hydrogen peroxide.

II. Drain and Sink Cleaner

Various aspects of the embodiments relate to a method of cleaning and/or disinfecting a sink, drain, or pipe, comprising contacting the sink, drain, or pipe with a mixture comprising a concentrate as described herein and water. Contacting can optionally comprise, for example, pouring the mixture on a surface of the sink, drain, or pipe. In certain embodiments, the duration of contacting can be at least about 5 seconds, 10 seconds, 15 seconds, 20 seconds, 30 seconds, 1 minute, 2 minutes, 5 minutes, or 10 minutes, e.g., prior to contacting the sink, drain, or pipe with another liquid such as prior to running water through the sink, drain, or pipe.

In some embodiments, the method further comprises contacting the sink, drain, or pipe with a composition comprising carbonate, bicarbonate, and/or carbonic acid either before, after, or at about the same time as contacting the sink, drain, or pipe with the mixture comprising the concentrate and water, thereby generating carbon dioxide. The generation of carbon dioxide can result in a foam, which can improve the cleaning and/or disinfecting performance of the mixture. The composition comprising carbonate, bicarbonate, and/or carbonic acid may comprise, for example, about 0.01% to about 10% carbonate, bicarbonate, and/or carbonic acid (w/v) or about 0.001 M to about 1 M. The concentration of the carbonate, bicarbonate, and/or carbonic acid in the composition is not particularly limiting because added volume can compensate for reduced concentration.

In some embodiments, the concentrate comprises carbonate, bicarbonate, and/or carbonic acid, and contacting the sink, drain, or pipe with the mixture comprising the concentrate and water generates carbon dioxide (e.g., thereby producing a foam). In such embodiments, the concentrate typically includes carbonates (carbonate, bicarbonate, and/or carbonic acid) at about 1% to about 10%.

In some embodiments, the sink, drain, or pipe is contaminated with a microbe, and contacting the sink, drain, or pipe with the mixture comprising the concentrate reduces the contamination. For example, one or more surfaces of the sink, drain, or pipe can be contaminated with *Listeria monocytogenes*, *Salmonella enterica*, or *Escherichia coli* prior to the contacting, and the contacting can reduce the contamination with *Listeria monocytogenes*, *Salmonella enterica*, or *Escherichia coli* by at least about 90%, 99%, 99.9%, 99.99%, 99.999%, or 99.9999%. One or more surfaces of the sink, drain, or pipe can be contaminated with *E. coli, S. aureus, P. aeruginosa, K. pneumoniae*, Group A *Streptococcus*, Group D *Streptococcus, Listeria, Salmonella*, the bacteria of a biofilm, a yeast, a fungus, or a norovirus prior to the contacting, and the contacting can reduce the contamination with the *E. coli, S. aureus, P. aeruginosa, K. pnemnnoniae*, Group A *Streptococcus*, Group D *Streptococcus, Listeria, Salmonella*, the bacteria of the biofilm, the yeast, the fungus, or the norovirus by at least about 90%, 99%, 99.9%, 99.99%, 99.999%, or 99.9999%.

One advantage of the concentrates disclosed herein is that they chemically kill pathogens, and thus, the concentrates display broad-spectrum anti-microbial activity against bacteria including antibiotic-resistant strains of bacteria. One or more surfaces of the sink, drain, or pipe can be contaminated with methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, or *Clostridium difficile* prior to the contacting, and the contacting can reduce the contamination with the methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, or *Clostridium difficile* by at least about 90%, 99%, 99.9%, 99.99%, 99.999%, or 99.9999%.

In various embodiments, the sink, drain, or pipe is not contaminated with a microbe, and yet, the method is performed as a precaution in light of a probability that the sink, drain, or pipe is contaminated with a microbe. For example, in some embodiments, a probability exists that the sink, drain, or pipe is contaminated with a pathogen (e.g., a gram-positive bacteria, a gram-negative bacteria, a fungi, yeast, or virus), and the sink, drain, or pipe is contacted with the mixture. The mixture may be capable of reducing the contamination by one or more pathogens with an efficacy described herein, and yet, the method is performed as a precaution and without knowledge of whether the mixture actually reduced contamination by any specific pathogen.

In some embodiments, the sink, drain, or pipe is not contaminated with a pathogen, and the method is performed to clean the sink, drain, or pipe, e.g., from non-pathogenic microbes. For example, a sink, drain, or pipe may be contaminated with a non-pathogenic bacteria, mold, or organism.

In some embodiments, the sink, drain, or pipe is contaminated with *Drosophila* larvae prior to the contacting, and the contacting reduces the percentage of viable *Drosophila* larvae by at least about 10%, 20%, 30%, 40%, 50%, 60%, 70%, 80%, or 90% (i.e., wherein the percentage of viable *Drosophila* larvae refers to the percentage of larvae that mature into fruit flies). The concentrate may optionally comprise an organic molecule that is a pesticide, such as phenethyl priopionate, although mixtures of concentrate as described herein and water display efficacy against *Drosophila* larvae even in the absence of a pesticide.

The mixture may comprise the concentrate and water at a ratio of about 1:1 to about 1:1000 such as about 1:5 to about 1:500, about 1:10 to about 1:200, or about 1:10, 1:32, 1:50, 1:64, 1:100, 1:128, 1:250, 1:256, 1:500, 1:512, or 1:1000.

A method may optionally further comprise mixing the concentrate and water, thereby producing the mixture. The method may comprise mixing the concentrate and water at a ratio of about 1:1 to about 1:1000 such as about 1:5 to about 1:500, about 1:10 to about 1:200, or about 1:10, 1:32, 1:50, 1:64, 1:100, 1:128, 1:250, 1:256, 1:500, 1:512, or 1:1000. The water can optionally be hard water such as about 75 to about 150 ppm $CaCO_3$ water, about 100 to about 200 ppm $CaCO_3$ water, about 150 to about 300 ppm $CaCO_3$ water, about 200 to about 400 ppm $CaCO_3$ water, or >300 ppm $CaCO_3$ water. In some embodiments, the water is soft water, e.g., <75 ppm $CaCO_3$ water.

III. Anti-Biofilm Activity

Various aspects of the embodiments relate to a method of chemically ablating biofilm, comprising contacting the biofilm with a mixture comprising a cleaning and disinfecting composition concentrate as described herein and water. Contacting may comprise, for example, submersing or coating the biofilm or a portion thereof with the mixture. In certain embodiments, the duration of contacting can be at least about 5 seconds, 10 seconds, 15 seconds, 20 seconds, 30 seconds, 1 minute, 2 minutes, 5 minutes, or 10 minutes, e.g., prior to rinsing, wiping, or scouring the mixture off of the biofilm.

The method may further comprise scouring the biofilm, e.g., with an abrasive or a blade, either before or after the contacting. Scouring the biofilm prior to contacting the biofilm with the mixture may increase the efficacy of the method, for example, by increasing the surface area of the biofilm in contact with the mixture. Scouring the biofilm subsequent to contacting the biofilm with the mixture may increase the efficacy of the method, for example, by removing any surviving microorganisms of the biofilm from a surface.

The biofilm may comprise, for example, *Pseudomonas aeruginosa*, *Escherichia coli*, *Listeria monocytogenes*, *Streptococcus* (e.g., *Streptococcus pneumoniae*, *Streptococcus mutans*), or *Candida* (e.g., *Candida albicans*).

In some embodiments, a method is effective at killing at least about 10%, 20%, 30%, 40%, 50%, 60%, 70%, 80%, 90%, 95%, 99%, 99.9%, or 99.99% of the cells of the biofilm.

The mixture may comprise the concentrate and water at a ratio of about 1:1 to about 1:1000 such as about 1:5 to about 1:500, about 1:10 to about 1:200, or about 1:10, 1:32, 1:50, 1:64, 1:100, 1:128, 1:250, 1:256, 1:500, 1:512, or 1:1000.

A method may optionally further comprise mixing the concentrate and water, thereby producing the mixture. The method may comprise mixing the concentrate and water at a ratio of about 1:1 to about 1:1000 such as about 1:5 to about 1:500, about 1:10 to about 1:200, or about 1:10, 1:32, 1:50, 1:64, 1:100, 1:128, 1:250, 1:256, 1:500, 1:512, or 1:1000. The water can optionally be hard water such as about 75 to about 150 ppm $CaCO_3$ water, about 100 to about 200 ppm $CaCO_3$ water, about 150 to about 300 ppm $CaCO_3$ water, about 200 to about 400 ppm $CaCO_3$ water, or >300 ppm $CaCO_3$ water. In some embodiments, the water is soft water, e.g., <75 ppm $CaCO_3$ water.

Various aspects of the invention relate to a composition comprising (a) a biofilm and (b) a mixture comprising a cleaning and disinfection composition concentrate as described herein and water.

IV. Fabric Cleaner

Various aspects of the embodiments relate to a method of laundering fabric, comprising contacting the fabric with a mixture comprising a cleaning and disinfecting concentrate composition as described herein and water. The fabric may comprise, for example, cotton, wool, silk, linen, polyester, nylon, spandex, acrylic fiber, and/or aramid fiber. The fabric may be, for example, the fabric of clothing, towel(s), and/or bedding.

Laundering fabric may comprise washing fabric such as in a washing machine or by hand. Laundering fabric may comprise steaming fabric. Laundering fabric may comprise dry cleaning.

In some embodiments, the method comprises washing the fabric (e.g., with a conventional laundry detergent) and then contacting the fabric with the mixture. The method may comprise dry cleaning the fabric and then contacting the fabric with the mixture. Various aspects of the embodiments relate to the finding a fabric that has been contacted with a mixture as described herein maintains residual activity against microbes and pathogens even if the fabric is ironed after the contacting. In some embodiments, the method comprises ironing or steaming the fabric. The ironing or steaming may be performed, for example, after contacting the fabric with the mixture.

In certain embodiments, the duration of contacting can be at least about 5 seconds, 10 seconds, 15 seconds, 20 seconds, 30 seconds, 1 minute, 2 minutes, 5 minutes, 10 minutes, 15 minutes, 20 minutes, 30 minutes, 40 minutes, 45 minutes, or 60 minutes, e.g., prior to rinsing the fabric (for example, in a washing machine) or drying the fabric (for example, during dry cleaning).

The mixture may be, for example, a liquid or an aerosol.

In some embodiments, a fabric laundered by the method displays reduced bacterial growth upon contact with bacteria relative to a control fabric that has not been laundered by contacting the control fabric with the mixture. For example, in some embodiments, the fabric displays reduced *Klebsiella pneumoniae*, *Staphylococcus aureus*, *Enterococcus faecalis*, *Pseudomonas aeruginosa*, or *Streptococcus pyogenes* growth upon contact with *Klebsiella pneumoniae, Staphylococcus aureus, Enterococcus faecalis, Pseudomonas aeruginosa*, or *Streptococcus pyogenes*, respectively, relative to fabric that has not been contacted with the mixture. The reduced *Klebsiella pneumoniae, Staphylococcus aureus, Enterococcus faecalis. Pseudomonas aeruginosa*, or *Streptococcus pyogenes* growth may be, for example, at least 10/o, 20%, 30%, 40%, 50%, 60%, 70%, 80%, 90%, 95%, 99%, 99.9%, 99.99%, 99.999%, or 99.9999% reduced *Klebsiella pneumoniae, Staphylococcus aureus, Enterococcus faecalis, Pseudomonas aeruginosa*, or *Streptococcus pyogenes* growth, respectively.

In some embodiments, the fabric is contaminated with a pathogen prior to contacting the fabric with the mixture. One advantage of the method is that the contacting can reduce the contamination with the pathogen. For example, the contacting can reduce the contamination by at least about 10%, 20%, 30%, 40%, 50%, 60%, 70%, 80%, 90%, 95%, 99%, 99.9%, 99.99%, 99.999%, or 99.9999%. The pathogen can be, for example, *E. coli, S. aureus, P. aeruginosa, K. pneumoniae*, Group A *Streptococcus*, Group D *Streptococcus, Listeria, Salmonella*, the bacteria of a biofilm, a yeast, a fungus, or a norovirus. In some embodiments, the pathogen is methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, or *Clostridium difficile*. In some embodiments, contacting the fabric with the mixture completely kills at least one species of pathogen on the surface of the fabric. Contacting the fabric with the mixture may also completely kill at least one species of pathogen in the fabric.

The mixture may comprise the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000.

A method may optionally further comprise mixing the concentrate and water, thereby producing the mixture. The method may comprise mixing the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000. The water can optionally be hard water such as about 75 to about 150 ppm $CaCO_3$ water, about 100 to about 200 ppm $CaCO_3$ water, about 150 to about 300 ppm $CaCO_3$ water, about 200 to about 400 ppm $CaCO_3$ water, or >300 ppm $CaCO_3$ water. In some embodiments, the water is soft water, e.g., <75 ppm $CaCO_3$ water.

In certain embodiments, the method further comprises billing a client for laundering the fabric. In some embodiments, the method further comprises hanging the fabric on a clothes hanger. In some embodiments, the method further comprises folding the fabric.

Various aspects of the invention relate to a composition comprising (a) fabric and (b) a mixture comprising a cleaning and disinfecting composition concentrate as described herein and water. The fabric may be, for example, clothing, towel(s), and/or bedding.

V. Food and Produce Decontaminate

Various aspects of the embodiments relate to a method of washing food or produce, comprising contacting the produce with a mixture comprising a cleaning and disinfecting composition concentrate as described herein and water. One of the advantages of mixtures comprising the concentrates described herein is that they lack chemicals that display toxicity in humans such as halogenated antimicrobial agents.

The food or produce can be, for example, any type of fruit, vegetable, grain, nut, meat, or egg. The method may further comprise harvesting the food or produce, e.g., wherein the food or produce is contacted with the mixture before, after, or during the harvesting. The method may further comprise packaging the food or produce, e.g., wherein the food or produce is contacted with the mixture before the packaging. The method may further comprise rinsing or washing the food or produce (e.g., with water) after contacting the food or produce with the mixture (e.g., to remove the mixture from the food or produce or dilute the mixture). Various aspects of the embodiments relate to the development of formulations that can be used to sanitize food and produce without requiring a subsequent rinsing step. A method may comprise contacting food or produce with a mixture as described herein and then packaging the food or produce, wherein the food or produce is not rinsed between the contacting and the packaging.

A meat can be selected from beef, pork, lamb, sheep, chicken, turkey, wild game, fish, or shellfish. The method may further comprise slaughtering the food, e.g., wherein the food is contacted with the mixture after slaughtering the food. The method may further comprise butchering the food, e.g., wherein the food is contacted with the mixture before or after butchering the food. In some embodiments, the food is not rinsed after it is contacted with the mixture.

Contacting may comprise either submersing the food or produce in the mixture or spraying or rinsing the food or produce with the mixture. In certain embodiments, the duration of contacting can be at least about 5 seconds, 10 seconds, 15 seconds, 20 seconds, 30 seconds, 1 minute, 2 minutes, 5 minutes, or 10 minutes, e.g., prior to rinsing the food or produce. In certain embodiments, the food or produced is not rinsed after contacting it with the mixture. The duration of contacting can be at least about 5 seconds, 10 seconds, 15 seconds, 20 seconds, 30 seconds, 1 minute, 2 minutes, 5 minutes, or 10 minutes, e.g., prior to removing the food or produce from total or partial submersion in the mixture. In some embodiments, the mixture is not removed from the food or produce.

In some embodiments, the food or produce is susceptible to contamination with a microbe, e.g., wherein the microbe correlates with spoliation of the food or produce or the microbe is a pathogen. Examples of microbes that correlate with the spoliation of food or produce include gram-positive bacteria, gram-negative bacteria, mold, yeast, and fungus. Contacting the food or produce with the mixture preferably reduces any contamination with the microbe. For example, contacting the food or produce with the mixture may reduce contamination with the microbe by at least about 10%, 20%, 30%, 400, 50%, 60%, 70%, 80%, 90%, 95%, 99%, 99.9%, 99.99%, 99.999%, or 99.9999%, e.g., relative to food or produce that is not contacted with the mixture. In some embodiments, the food or produce is not known to be contaminated with a microbe, and yet the food or produce is nevertheless contacted with the mixture as a precaution or as part of a standard operation procedure. In some embodiments, contacting the food or produce with the mixture completely kills at least one species of microbe on the surface of the food or produce. Contacting the food or produce with the mixture may completely kill at least one species of microbe in the food or produce. Whether the mixture is capable of completely killing at least one species of microbe in the food or produce depends on whether the microbe is accessible to the mixture. For example, the contacting may kill all microbes on the surface of a carcass, but the contacting is unlikely to kill any microbes that may be present in an abscess within the carcass.

In some embodiments, contacting the food or produce with the mixture is capable of reducing contamination with *Listeria monocytogenes*, *Salmonella enterica*, and/or *Escherichia coli*, e.g., by at least about 10%, 20%, 30%, 40%, 50%, 60%, 70%, 80%, 90%, 95%, 99%, 99.9%, 99.99%, 99.999%, or 99.9999%. The mixture may be capable of completely killing *Listeria monocytogenes*, *Salmonella enterica*, and/or *Escherichia coli*. In some embodiments, contacting the food or produce with the mixture is capable of reducing contamination with *E. coli, S. aureus, P. aeruginosa, K. pneumoniae*, Group A *Streptococcus*, Group D *Streptococcus, Listeria, Salmonella*, a yeast, a fungus, and/or a norovirus, e.g., by at least about 10%, 20%, 30%, 40%, 50%, 60%, 70%, 80%, 90%, 95%, 99%, 99.9%, 99.99%, 99.999%, or 99.9999%. The mixture may be capable of completely killing *E. coli, S. aureus, P. aeruginosa, K pneumoniae*, Group A *Streptococcus*, Group D *Streptococcus, Listeria, Salmonella*, a yeast, a fungus, and/or a norovirus. In some embodiments, contacting the food or produce with the mixture is capable of reducing contamination with insect larvae, e.g., by at least about 10%, 20%, 30%, 40%, 50%, 60%, 70%, 80%, 90%, 95%, or 99%. In some embodiments, contacting the food or produce with the mixture is capable of reducing contamination with methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, and/or *Clostridium difficile*, e.g., by at least about 10%, 20%, 30%, 40%, 50%, 60%, 70%, 80%, 90%, 95%, 99%, 99.9%, 99.99%, 99.999%, or 99.9999%. The mixture may be capable of completely killing methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, and/or *Clostridium difficile*.

The mixture may comprise the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000.

A method may optionally further comprise mixing the concentrate and water, thereby producing the mixture. The method may comprise mixing the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000. The water can optionally be hard water such as about 75 to about 150 ppm $CaCO_3$ water, about 100 to about 200 ppm $CaCO_3$ water, about 150 to about 300 ppm $CaCO_3$ water, about 200 to about 400 ppm $CaCO_3$ water, or >300 ppm $CaCO_3$ water. In some embodiments, the water is soft water, e.g., <75 ppm $CaCO_3$ water.

In some embodiments, the method further comprises selling the food or produce. In some embodiments, the method further comprises transferring the food or produce to an individual or entity that either owns the food or produce or that has purchased the food or produce. Transferring includes direct transfer, e.g., by selling the food or produce in a store or by serving the food or produce in a restaurant, and indirect transfer, e.g., by transferring the food or produce to a third party transportation service for delivery to the individual or entity.

Various aspects of the invention relate to a composition comprising (a) food or produce and (b) a mixture comprising a cleaning and disinfecting composition concentrate as described herein and water. The food or produce may be selected from fruits, vegetables, grains, nuts, meat, and/or eggs. The meat may be selected from beef, pork, lamb, sheep, chicken, turkey, wild game, fish, or shellfish.

VI. All-Purpose Cleaner

Various aspects of the embodiments relate to a method of cleaning and/or disinfecting a surface, comprising contacting the surface with a mixture comprising a cleaning and disinfecting composition concentrate and water. The nature of the surface is not particularly limiting. The surface can be or comprise, for example, wood, tile, ceramic, porcelain, glass, fabric, leather, carpet, linoleum, laminate, metal, rock, marble, granite, slate, concrete, asphalt, brick, paint, plaster, Styrofoam, plastic, silicone, or rubber, or two or more of the foregoing.

Contacting may comprise pouring the mixture onto the surface, spraying the mixture onto the surface, or rubbing the mixture onto the surface (e.g., with a towel, sponge, mop, or brush) although the precise nature of the contacting is not particularly limiting. In certain embodiments, the duration of contacting can be at least about 5 seconds, 10 seconds, 15 seconds, 20 seconds, 30 seconds, 1 minute, 2 minutes, 5 minutes, or 10 minutes, e.g., prior to rinsing the surface.

In some embodiments, the surface is contaminated with a microbe or pathogen prior to the contacting. For example, the surface may be contaminated with *E. coli, S. aureus, P. aeruginosa, K. pneumoniae*, Group A *Streptococcus*, Group D *Streptococcus, Listeria, Salmonella*, the bacteria of a biofilm, a yeast, a fungus, and/or a norovirus. In some embodiments, the surface is contaminated with methicillin-resistant *S. aureus*, vancomycin-resistant *S. aureus*, vancomycin-resistant *Enterococcus*, drug-resistant non-typhoidal *Salmonella*, drug-resistant *Salmonella* serotype *Typhi*, drug-resistant *Streptococcus pneumoniae*, erythromycin-resistant Group A *Streptococcus*, clindamycin-resistant Group B *Streptococcus*, multidrug-resistant *P. aeruginosa*, carbapenem-resistant Enterobacteriaceae, and/or *Clostridium difficile*. Contacting the surface with the mixture may reduce contamination with one or more microbe(s) or pathogen(s) including those enumerated above by at least about 10%, 20%, 30%, 40%, 50%, 60%, 70%, 80%, 90%, 95%, 99%, 99.9%, 99.99%, 99.999%, or 99.9999%, e.g., relative to a surface that is not contacted with the mixture.

In some embodiments, the surface is not known to be contaminated with a microbe or pathogen, and yet the surface is contacted with the mixture as a precaution or as part of a standard operating procedure. In some embodiments, contacting the surface with the mixture completely kills at least one species of microbe or pathogen on the surface.

The mixture may comprise the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000.

A method may optionally further comprise mixing the concentrate and water, thereby producing the mixture. The method may comprise mixing the concentrate and water at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000. The water can optionally be tap water (e.g., from a municipal water supply). The water can optionally be hard water such as about 75 to about 150 ppm $CaCO_3$ water, about 100 to about 200 ppm $CaCO_3$ water, about 150 to about 300 ppm $CaCO_3$ water, about 200 to about 400 ppm $CaCO_3$ water, or >300 ppm $CaCO_3$ water. In some embodiments, the water is soft water, e.g., <75 ppm $CaCO_3$ water.

Various aspects of the invention relate to a spray bottle comprising a cleaning and disinfecting composition concentrate as described herein. In some embodiments, the spray bottle comprises a mixture of the concentrate and water, e.g., at a ratio of about 1:1 to about 1:2000 such as about 1:50 to about 1:2000, about 1:100 to about 1:1000, about 1:5 to about 1:500, about 1:10 to about 1:200, or about 1:10, 1:32, 1:50, 1:64, 1:100, 1:128, 1:250, 1:256, 1:500, 1:512, or 1:1000.

Various aspects of the invention relate to a composition comprising (a) a sponge, mop, or towel and (b) a mixture comprising a cleaning and disinfecting composition concentrate as described herein and water.

EXEMPLIFICATION

Example 1. Formulations

The formulations of Tables 1A-5F were prepared in water.

TABLE 1A

Drain Cleaner

| | Drain Cleaner 1 (128x: liquid) | | Drain Cleaner 2-A (64x; liquid) | | Drain Cleaner 2P-A (64x; liquid) | |
|---|---|---|---|---|---|---|
| Organic Acid | Citric Acid | 28.0% | Citric Acid | 20.0% | Citric Acid | 20.0% |
| Fatty Acid | Oleic Acid | 2.21% | Oleic Acid | 1.11% | Oleic Acid | 1.11% |
| Surfactant | Sodium Lauryl Sulfate | 10.5% | Sodium Lauryl Sulfate | 5.47% | Sodium Lauryl Sulfate | 5.25% |
| Alcohol | Isopropanol | 5.49% | Isopropanol | 2.75% | Isopropanol | 2.75% |
| Carbonate | Sodium Bicarbonate | 2.94% | | | | |
| Sulfate | Sodium Sulfate | 5.12% | Sodium Sulfate | 2.56% | Sodium Sulfate | 2.56% |
| Pesticide | | | | | Phenethyl priopionate | 2.00% |
| pH | 2.34 | | 1.6 | | 2.57 | |

TABLE 1B

Drain Cleaner

| | Drain Cleaner 3-A (64x; liquid) | | Drain Cleaner PN-A (64x; liquid) | |
|---|---|---|---|---|
| Organic Acid | Citric Acid | 20.0% | Citric Acid | 20.0% |
| Fatty Acid | Oleic Acid | 1.11% | Oleic Acid | 1.11% |
| Surfactant | Sodium Lauryl Sulfate | 5.25% | Sodium Lauryl Sulfate | 5.47% |
| Alcohol | Isopropanol | 2.75% | Isopropanol | 2.75% |
| Carbonate | Sodium Bicarbonate | 0.50% | | |
| Sulfate | Sodium Sulfate | 2.56% | Sodium Sulfate | 2.56% |
| Organic Analysis | | | 76% | |
| pH | | | 1.5 +/− 0.25 | |

TABLE 2

Biofilm Remover

| | Biofilm Remover (128x; liquid) | |
|---|---|---|
| Organic Acid | Citric Acid | 30.0% |
| Fatty Acid | Oleic Acid | 2.22% |
| Surfactant | Sodium Lauryl Sulfate | 10.95% |
| Alcohol | Isopropanol | 5.50% |
| Sulfate | Sodium Sulfate | 5.12% |
| Organic Analysis | 80% | |
| pH | 1.39 | |

TABLE 3

Laundry Sanitizer

| | Laundry Sanitizer 1 (128x; liquid) | | Laundry Sanitizer 2 (128x; liquid) | |
|---|---|---|---|---|
| Organic Acid | Citric Acid | 32.0% | Citric Acid | 30.0% |
| Fatty Acid | | | Oleic Acid | 2.21% |
| Surfactant | Sodium Lauryl Sulfate | 10.5% | Sodium Lauryl Sulfate | 10.5% |
| Alcohol | Isopropanol | 3.14% | Isopropanol | 3.14% |
| Sulfate | | | Sodium Sulfate | 2.56% |
| pH | 1.25 | | | |

TABLE 4

Produce and Food Rinse

| | NF-E1-EF (128x; liquid) |
|---|---|
| Citric Acid | 25.00% (24.25-25.75%) |
| Decanoic Acid | 2.29% (2.18-2.41%) |
| Sodium Lauryl Sulfate | 32.55% (31.58-33.52%) |
| Isopropanol | 4.90% (4.66-5.15%) |
| Sodium Bicarbonate | 2.62% (2.49-2.74%) |
| Water | 32.64% (31.66-33.62%) |
| pH | 2.81 |

TABLE 5A

MRP All-Purpose Cleaner

| | NF1 (128x; liquid) | NF2 (128x; liquid) | NF3 (128x; liquid) | NF3-MgSO$_4$ (128x; liquid) | NF4 (128x; liquid) |
|---|---|---|---|---|---|
| Citric Acid | 20.48% | 20.48% | 22.40% | 22.40% | 25.60% |
| Sodium Lauryl Sulfate | 5.00% | 10.24% | 5.00% | 5.00% | 5.00% |
| Isopropanol | 6.21% | 6.21% | 5.50% | 5.50% | 5.50% |
| Sodium Bicarbonate | 4.54% | 4.54% | 4.95% | 4.95% | 4.48% |
| Magnesium Sulfate Heptahydrate | | | | 1.00% | |
| Cinnamon Oil | | | | | 1.28% |
| pH | | | 2.982 | 2.982 | 2.815 |

TABLE 5B

MRP All-Purpose Cleaner

| | NF4-MgSO$_4$ (128x; liquid) | NF5 (128x; liquid) | NF6 (128x; liquid) | NF6-EDTA (128x; liquid) | NF7 (128x; liquid) |
|---|---|---|---|---|---|
| Citric Acid | 25.60% | 25.60% | 25.60% | 25.60% | 25.60% |
| Lauric Acid | | | | | 1.28% |
| Sodium Lauryl Sulfate | 5.00% | 10.24% | 10.50% | 10.50% | 10.50% |
| Isopropanol | 5.50% | 5.50% | 5.50% | 5.50% | 5.50% |
| Sodium Bicarbonate | 4.48% | 4.48% | 4.48% | 4.48% | 4.48% |
| Magnesium Sulfate Heptahydrate | 1.02% | | | | |
| Cinnamon Oil | 1.28% | 2.30% | | | |
| Sodium EDTA | | | | 2.56% | |
| Sodium Phosphate Dodecahydrate | | | | 2.56% | |
| Sodium Tripolyphosphate | | | | 2.56% | |
| Potassium Pyrophosphate | | | | 2.56% | |
| pH | 2.815 | 2.842 | | 2.842 | 2.842 |

TABLE 5C

MRP All-Purpose Cleaner

| | NF8 (128x; liquid) | NF8-Sulfate (128x; liquid) | NF9 (128x; liquid) | NF9-Sulfate (128x; liquid) | NF10 (128x; liquid) |
|---|---|---|---|---|---|
| Citric Acid | 25.60% | 25.60% | 25.60% | 25.60% | |
| Other Organic Acid | 12.80% Acetic Acid | 6.4% Ascorbic Acid | | | 20.98% Acetic Acid |
| Lauric Acid | 1.28% | 1.28% | 1.28% | 1.28% | 1.28% |
| Sodium Lauryl Sulfate | 10.50% | 10.50% | 10.50% | 10.50% | 10.50% |
| Isopropanol | 5.50% | 5.50% | 5.49% | 5.49% | 5.49% |
| Sodium Sulfate | | 5.12% | | 5.12% | |
| Sodium Bicarbonate | | | 2.60% | 2.60% | 0.26% |
| pH | 1.975 | 1.975 | 2.26 | 2.26 | 2.68 |

TABLE 5D

MRP All-Purpose Cleaner

| | NF11 (128x; liquid) | NF12 (128x; liquid) | NF13 (128x; liquid) | NF14 (128x; liquid) | NF14B (128x; liquid) |
|---|---|---|---|---|---|
| Citric Acid | 25.60% | 25.60% | 25.60% | 25.60% | 25.60% |
| Other Organic Acid | 10.49% Acetic Acid | | | | |
| Fatty Acid | 1.28% Lauric Acid | | | 2.56% Decanoic Acid | 2.56% Decanoic Acid |
| Sodium Lauryl Sulfate | 10.50% | 10.50% | 10.50% | 10.50% | 10.50% |
| Isopropanol | 5.49% | 5.49% | 5.49% | 5.49% | 5.49% |
| Sodium Bisulfate | | | | | 5.20% |
| Sodium Bicarbonate | 2.60% | 2.60% | 2.00% | 2.60% | 4.79% |
| Essential Oil | | 1.28% Cinnamon Oil | 1.28% Vanillin | | |
| pH | 2.26 | 2.28 | 2.312 | 2.539 | 2.511 |

TABLE 5E

MRP All-Purpose Cleaner

| | NF15 (64x; liquid) | NF15B (64x; liquid) | NF16 (128x; liquid) | NF17 (128x; liquid) | NF18 (128x; liquid) |
|---|---|---|---|---|---|
| Citric Acid | 25.60% | 25.60% | | 25.60% | 25.60% |
| Other Organic Acid | | | 20.98% Acetic Acid | | |
| Fatty Acid | 1.28% Decanoic Acid | 1.28% Decanoic Acid | 2.56% Decanoic Acid | 1.28% Lauric Acid | |
| Sodium Lauryl Sulfate | 10.50% | 10.50% | 10.50% | 10.50% | 10.50% |
| Isopropanol | 5.49% | 5.49% | | | 5.49% |
| Sodium Sulfate | | | | | 5.12% |
| Sodium Bisulfate | | 5.20% | | | |
| Sodium Bicarbonate | 2.60% | 4.79% | | | 2.60% |
| Essential Oil | | | | | 2.50% Orange Oil |
| Sodium Citrate | | | | 1.79% | |
| Hydrogen Peroxide | | | | | 7.00% |
| pH | 2.23 | 1.83 | 2.68 | 2.320 | 2.541 |

TABLE 5F

MRP All-Purpose Cleaner

| | NF-20 (128x; liquid) | NF-MRP3-V (128x; liquid) | NF-MRP2-V (128x; liquid) | NF-MRP1-V (128x; liquid) | NF-MRP1 (128x; liquid) |
|---|---|---|---|---|---|
| Citric Acid | 25.60% | 28.0% | 28.0% | 28.0% | 28.0% |
| Oleic Acid | | 1.77% | 1.77% | 1.77% | 2.21% |
| Sodium Lauryl Sulfate | 10.50% | 10.95% | 10.95% | 10.50% | 10.50% |
| Isopropanol | 3.14% | 5.49% | 5.49% | 5.49% | 5.49% |
| Sodium Bicarbonate | | 2.94% | 2.94% | 2.94% | 2.94% |
| Sodium Sulfate | 5.12% | 4.00% | 4.00% | 4.00% | 5.12% |

TABLE 5F-continued

MRP All-Purpose Cleaner

|  | NF-20 (128x; liquid) | NF-MRP3-V (128x; liquid) | NF-MRP2-V (128x; liquid) | NF-MRP1-V (128x; liquid) | NF-MRP1 (128x; liquid) |
|---|---|---|---|---|---|
| Essential Oil | 3.00% d-Limonene | 0.25% Vanillin | 0.50% Vanillin | 1.60% Vanillin |  |
| Hydrogen Peroxide | 3.99% |  |  |  |  |
| pH | 1.64 | 2.17 | 2.17 | 2.34 | 2.34 |

Example 2. Additional Formulations

TABLE 6A

Examples of Acetic Acid, Capric Acid, Lauryl Sulfate, Isopropanol formulations

|  | A1 | A2 | A3 | A4 | A5 | A6 |
|---|---|---|---|---|---|---|
| Acetic Acid | 22-28% | 22-28% | 22-28% | 26%-32% | 26%-32% | 26%-32% |
| Capric Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Isopropanol | 3-6% | 3-6% | 3-6% | 3-6% | 3-6% | 3-6% |
| Bicarbonate | 0-4% | 0-4% | 0-4% | 0-4% | 0-4% | 0-4% |
| Sulfate | 2-4% | 2-4% | 2-4% | 2-4% | 2-4% | 2-4% |
| Hydrogen Phosphate | 0-6% | 0-6% | 0-6% | 0-6% | 0-6% | 0-6% |
| d-Limonene | 0-2% | 0-2% | 0-2% | 0-2% | 0-2% | 0-2% |
| Hydrogen Peroxide | 0-6% | 0-6% | 0-6% | 0-6% | 0-6% | 0-6% |
| Water | 25-60% | 20-55% | 15-50% | 25-60% | 20-55% | 15-50% |

TABLE 6B

Examples of Citric Acid, Capric Acid, Lauryl Sulfate, Ethanol formulations

|  | B1 | B2 | B3 | B4 | B5 | B6 |
|---|---|---|---|---|---|---|
| Citric Acid | 20-26% | 20-26% | 20-26% | 24%-30% | 24%-30% | 24%-30% |
| Capric Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Ethanol | 3-6% | 3-6% | 3-6% | 3-6% | 3-6% | 3-6% |
| Bicarbonate | 2-4% | 2-4% | 2-4% | 2-4% | 2-4% | 2-4% |
| Sulfate | 0-4% | 0-4% | 0-4% | 0-4% | 0-4% | 0-4% |
| Hydrogen Phosphate | 0-6% | 0-6% | 0-6% | 0-6% | 0-6% | 0-6% |
| Orange Oil | 0.2-2% | 0.2-2% | 0.2-2% | 0.2-2% | 0.2-2% | 0.2-2% |
| Water | 25-60% | 20-55% | 15-50% | 25-60% | 20-55% | 15-50% |

TABLE 6C

Examples of Ascorbic Acid, Capric Acid, Lauryl Sulfate, Ethanol formulations

|  | C1 | C2 | C3 | C4 | C5 | C6 |
|---|---|---|---|---|---|---|
| Ascorbic Acid | 22-28% | 22-28% | 22-28% | 26%-32% | 26%-32% | 26%-32% |
| Capric Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Ethanol | 3-6% | 3-6% | 3-6% | 3-6% | 3-6% | 3-6% |
| Bicarbonate | 0-4% | 0-4% | 0-4% | 0-4% | 0-4% | 0-4% |
| Sulfate | 0-4% | 0-4% | 0-4% | 0-4% | 0-4% | 0-4% |
| Hydrogen Phosphate | 2-6% | 2-6% | 2-6% | 2-6% | 2-6% | 2-6% |

TABLE 6C-continued

Examples of Ascorbic Acid, Capric Acid, Lauryl Sulfate, Ethanol formulations

|  | C1 | C2 | C3 | C4 | C5 | C6 |
|---|---|---|---|---|---|---|
| Vanillin | 0-2% | 0-2% | 0-2% | 0-2% | 0-2% | 0-2% |
| Hydrogen Peroxide | 0-6% | 0-6% | 0-6% | 0-6% | 0-6% | 0-6% |
| Water | 25-60% | 20-55% | 15-50% | 25-60% | 20-55% | 15-50% |

TABLE 6D

Examples of Citric Acid, Capric Acid, Lauryl Sulfate, Isopropanol formulations

|  | B1 | B2 | B3 | B4 | B5 | B6 |
|---|---|---|---|---|---|---|
| Citric Acid | 20-26% | 20-26% | 20-26% | 24%-30% | 24%-30% | 24%-30% |
| Capric Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Isopropanol | 3-6% | 3-6% | 3-6% | 3-6% | 3-6% | 3-6% |
| Sulfate | 0-4% | 0-4% | 0-4% | 0-4% | 0-4% | 0-4% |
| Hydrogen Phosphate | 0-6% | 0-6% | 0-6% | 0-6% | 0-6% | 0-6% |
| d-Limonene | 0.2-1.2% | 0.2-1.2% | 0.2-1.2% | 0.2-1.2% | 0.2-1.2% | 0.2-1.2% |
| Hydrogen Peroxide | 2-6% | 2-6% | 2-6% | 2-6% | 2-6% | 2-6% |
| Water | 25-60% | 20-55% | 15-50% | 25-60% | 20-55% | 15-50% |

TABLE 6E

Examples of Acetic Acid, Oleic Acid, Lauryl Sulfate, Isopropanol formulations

|  | A1 | A2 | A3 | A4 | A5 | A6 |
|---|---|---|---|---|---|---|
| Acetic Acid | 22-28% | 22-28% | 22-28% | 26%-32% | 26%-32% | 26%-32% |
| Oleic Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Isopropanol | 3-6% | 3-6% | 3-6% | 3-6% | 3-6% | 3-6% |
| Bicarbonate | 0-4% | 0-4% | 0-4% | 0-4% | 0-4% | 0-4% |
| Sulfate | 2-4% | 2-4% | 2-4% | 2-4% | 2-4% | 2-4% |
| Hydrogen Phosphate | 0-6% | 0-6% | 0-6% | 0-6% | 0-6% | 0-6% |
| d-Limonene | 0-2% | 0-2% | 0-2% | 0-2% | 0-2% | 0-2% |
| Hydrogen Peroxide | 0-6% | 0-6% | 0-6% | 0-6% | 0-6% | 0-6% |
| Water | 25-60% | 20-55% | 15-50% | 25-60% | 20-55% | 15-50% |

TABLE 6F

Examples of Citric Acid, Oleic Acid, Lauryl Sulfate, Ethanol formulations

|  | B1 | B2 | B3 | B4 | B5 | B6 |
|---|---|---|---|---|---|---|
| Citric Acid | 20-26% | 20-26% | 20-26% | 24%-30% | 24%-30% | 24%-30% |
| Oleic Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Ethanol | 3-6% | 3-6% | 3-6% | 3-6% | 3-6% | 3-6% |
| Bicarbonate | 2-4% | 2-4% | 2-4% | 2-4% | 2-4% | 2-4% |
| Sulfate | 0-4% | 0-4% | 0-4% | 0-4% | 0-4% | 0-4% |
| Hydrogen Phosphate | 0-6% | 0-6% | 0-6% | 0-6% | 0-6% | 0-6% |
| Orange Oil | 0.2-2% | 0.2-2% | 0.2-2% | 0.2-2% | 0.2-2% | 0.2-2% |
| Water | 25-60% | 20-55% | 15-50% | 25-60% | 20-55% | 15-50% |

TABLE 6G

Examples of Ascorbic Acid, Oleic Acid, Lauryl Sulfate, Ethanol formulations

|  | C1 | C2 | C3 | C4 | C5 | C6 |
|---|---|---|---|---|---|---|
| Ascorbic Acid | 22-28% | 22-28% | 22-28% | 26%-32% | 26%-32% | 26%-32% |
| Oleic Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Ethanol | 3-6% | 3-6% | 3-6% | 3-6% | 3-6% | 3-6% |
| Bicarbonate | 0-4% | 0-4% | 0-4% | 0-4% | 0-4% | 0-4% |
| Sulfate | 0-4% | 0-4% | 0-4% | 0-4% | 0-4% | 0-4% |
| Hydrogen Phosphate | 2-6% | 2-6% | 2-6% | 2-6% | 2-6% | 2-6% |
| Vanillin | 0-2% | 0-2% | 0-2% | 0-2% | 0-2% | 0-2% |
| Hydrogen Peroxide | 0-6% | 0-6% | 0-6% | 0-6% | 0-6% | 0-6% |
| Water | 25-60% | 20-55% | 15-50% | 25-60% | 20-55% | 15-50% |

TABLE 6H

Examples of Citric Acid, Lauric Acid, Lauryl Sulfate, Isopropanol formulations

|  | B1 | B2 | B3 | B4 | B5 | B6 |
|---|---|---|---|---|---|---|
| Citric Acid | 20-26% | 20-26% | 20-26% | 24%-30% | 24%-30% | 24%-30% |
| Lauric Acid | 1-3% | 1-3% | 1-3% | 0-2% | 0-2% | 0-2% |
| Lauryl Sulfate | 10-18% | 18-26% | 26-34% | 10-18% | 18-26% | 26-34% |
| Isopropanol | 3-6% | 3-6% | 3-6% | 3-6% | 3-6% | 3-6% |
| Sulfate | 0-4% | 0-4% | 0-4% | 0-4% | 0-4% | 0-4% |
| Hydrogen Phosphate | 0-6% | 0-6% | 0-6% | 0-6% | 0-6% | 0-6% |
| d-Limonene | 0.2-1.2% | 0.2-1.2% | 0.2-1.2% | 0.2-1.2% | 0.2-1.2% | 0.2-1.2% |
| Hydrogen Peroxide | 2-6% | 2-6% | 2-6% | 2-6% | 2-6% | 2-6% |
| Water | 25-60% | 20-55% | 15-50% | 25-60% | 20-55% | 15-50% |

Example 3. Residual Antimicrobial Activity of Fabric Rinsed with Laundry Sanitizer Against *Klebsiella pneumoniae* and *Staphylococcus aureus*

Fabric was washed using a 1:128, 1:256, or 1:512 dilution of formulation "Laundry Sanitizer 1" of Example 1. The fabric was tested by according to American Association of Textile Chemists and Colorists (AATCC) method 100 (AATCC 100) for residual activity against gram-negative bacteria *Klebsiella pneumoniae* growth and gram-positive bacteria *Staphylococcus aureus* growth. Briefly, bacteria were cultured in liquid tryptic soy broth media for 18 hours and then diluted with phosphate-buffered saline to a concentration of 100,000 CFU/mL. Fabric was cut into 4.8 cm diameter swatches and stacked at 4 swatches per stack, which was sufficient to absorb 1 mL liquid inoculum. Control and test materials were inoculated with 1 mL liquid inoculum and then incubated in a humid environment at body temperature (36° C.+ or −1° C.) for 24 hours. Microbe concentrations were determined at time zero by analysis of control materials immediately after inoculation, and the study commenced only if the time zero concentration was at least about 100,000 cells/carrier. The experiments were performed in duplicates. After incubation, each stack of swatches was rinsed with Dey-Engley neutralizing broth, and remaining live bacteria were grown on tryptic soy agar at 30° C.+ or −2° C. for 24 to 48 hours. Cell colonies were counted on the agar, and reductions of microorganism concentrations were calculated relative to controls.

Fabric treated with the 1:128 dilution of formulation Laundry Sanitizer 1 displayed a >99.9989% (>4.94 $Log_{10}$) reduction in *Klebsiella pneumoniae* growth and a >99.997% (>4.55 $Log_{10}$) reduction in *Staphylococcus aureus* growth relative to untreated controls.

TABLE 7

Residual Efficacy Against *Klebsiella pneumoniae* in Fabric washed with 1:128, 1:256, or 1:512 dilutions of formulation Laundry Sanitizer 1

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 685,000 | 713,000 | | |
| | | 2 | 740,000 | | | |
| 24 Hours | Control | 1 | 7,500 | 439,000 | | |
| | | 2 | 870,000 | | | |

TABLE 7-continued

Residual Efficacy Against *Klebsiella pneumoniae* in Fabric washed with 1:128, 1:256, or 1:512 dilutions of formulation Laundry Sanitizer 1

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| | Treated 1:128 | 1 | <5 | <5 | >99.9993% $Log_{10}$ > 5.15 | >99.9989% $Log_{10}$ > 4.94 |
| | | 2 | <5 | | | |
| | Treated 1:256 | 1 | 105 | 775,000 | none | none |
| | | 2 | 1,550,000 | | 0 | 0 |
| | Treated 1:512 | 1 | 4,950,000 | 2,520,000 | none | none |
| | | 2 | 97,000 | | 0 | 0 |

TABLE 8

Residual Efficacy Against *Staphylococcus aureus* in Fabric washed with 1:128, 1:256, or 1:512 dilutions of formulation Laundry Sanitizer 1

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 167,000 | 199,000 | | |
| | | 2 | 230,000 | | | |
| 24 Hours | Control | 1 | 195,000 | 176,000 | | |
| | | 2 | 157,000 | | | |
| | Treated 1:128 | 1 | <5 | <5 | >99.997% $Log_{10}$ > 4.60 | >99.997% $Log_{10}$ > 4.55 |
| | | 2 | <5 | | | |
| | Treated 1:256 | 1 | 1,470 | 1,520 | 99.24% $Log_{10}$ 2.12 | 99.14% $Log_{10}$ 2.06 |
| | | 2 | 1,570 | | | |
| | Treated 1:512 | 1 | 81,500 | 72,300 | 63.60% $Log_{10}$ 0.44 | 58.92% $Log_{10}$ 0.39 |
| | | 2 | 63,000 | | | |

Example 4. Residual Antimicrobial Activity of Fabric Washed with Laundry Sanitizer Against *Pseudomonas aeruginosa, Streptococcus Pyogenes*, and *Enterococcus faecalis*

Fabric was washed using a 1:128 dilution of formulation "Laundry Sanitizer 2" of Example 1. The fabric was tested according to American Association of Textile Chemists and Colorists (AATCC) method 100 (AATCC 100) for residual activity against gram-negative bacteria *Pseudomonas aeruginosa* growth and gram-positive bacteria *Streptococcus pyogenes* or *Enterococcus faecalis* growth. Briefly, *Streptococcus pyogenes* was cultured in liquid tryptic soy broth media comprising 5% sheep's blood and 0.10/Triton X-100 for 18 hours. *Pseudomonas aeruginosa* and *Enterococcus faecalis* were cultured in liquid tryptic soy broth media comprising 0.1% Triton X-100 for 18 hours. Cultured bacteria were then diluted with phosphate-buffered saline to a concentration of 100,000 CFU/mL. Fabric was cut into 4.8 cm diameter swatches and stacked at 4 swatches per stack, which was sufficient to absorb 1 mL liquid inoculum. Control and test materials were inoculated with 1 mL liquid inoculum and then incubated in a humid environment at body temperature (36° C.+ or −1° C.) for 24 hours. Microbe concentrations were determined at time zero by analysis of control materials immediately after inoculation, and the study commenced only if the time zero concentration was at least about 100.000 cells/carrier. The experiments were performed in duplicates. After incubation, each stack of swatches was rinsed with Dey-Engley neutralizing broth, and remaining live bacteria were grown on tryptic soy agar at 36° C.+ or −1° C. for 24 to 48 hours. *Streptococcus pyogenes* agar was supplemented with 5% sheep's blood and grown under 5% carbon dioxide. Cell colonies were counted on the agar, and reductions of microorganism concentrations were calculated relative to controls.

Fabric washed with the 1:128 dilution of formulation Laundry Sanitizer 2 displayed a >99.9997 (>5.58 $Log_{10}$) reduction in *Enterococcus faecalis* growth, a >99.996% (>4.38 $Log_{10}$) reduction in *Pseudomonas aeruginosa* growth, and a >99.9998% (>5.72 $Log_{10}$) reduction in *Streptococcus pyogenes* growth relative to untreated controls.

TABLE 9

Residual Efficacy Against *Enterococcus faecalis* in Fabric treated with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 95,000 | 97,800 | | |
| | | 2 | 101,000 | | | |
| 24 Hours | Control | 1 | 1,690,000 | 1,910,000 | | |
| | | 2 | 2,130,000 | | | |

TABLE 9-continued

Residual Efficacy Against *Enterococcus faecalis* in Fabric treated with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| | Treated 1:128 | 1 | <5 | <5 | >99.995% $Log_{10} > 4.29$ | >99.9997% $Log_{10} > 5.58$ |
| | | 2 | <5 | | | |

TABLE 10

Residual Efficacy Against *Pseudomonas aeruginosa* in Fabric treated with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 120,000 | 108,000 | | |
| | | 2 | 95,000 | | | |
| 24 Hours | Control | 1 | 56,000,000 | 54,400,000 | | |
| | | 2 | 52,800,000 | | | |
| | Treated 1:128 | 1 | 3,220 | 2,280 | 97.88% $Log_{10}$ 1.67 | 99.996% $Log_{10}$ 4.38 |
| | | 2 | 1,340 | | | |

TABLE 11

Residual Efficacy Against *Streptococcus pyogenes* in Fabric treated with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 3,600,000 | 3,800,000 | | |
| | | 2 | 4,000,000 | | | |
| 24 Hours | Control | 1 | 5,450,000 | 5,280,000 | | |
| | | 2 | 5,100,000 | | | |
| | Treated 1:128 | 1 | <10 | <10 | >99.9997% $Log_{10} > 5.58$ | >99.9998% $Log_{10} > 5.72$ |
| | | 2 | <10 | | | |

Example 5. Laundry Sanitizer and Fabric

Fabric was washed using a 1:128 dilution of formulation "Laundry Sanitizer 2" of Example 1. Some fabric samples were then steam pressed with an iron to determine whether steam pressing affects residual efficacy. The fabric was then tested according to American Association of Textile Chemists and Colorists (AATCC) method 100 (AATCC 100) for residual activity against gram-negative bacteria *Klebsiella pneumoniae* growth and gram-positive bacteria *Staphylococcus aureus* growth. Briefly, bacteria were cultured in liquid tryptic soy broth media comprising 0.1% Triton X-100 for 18 hours and then diluted with phosphate-buffered saline to a concentration of 100,000 CFU/mL. Fabric was cut into 4.8 cm diameter swatches and stacked at 4 swatches per stack, which was sufficient to absorb 1 mL liquid inoculum. Control and test materials were inoculated with 1 mL and then incubated in a humid environment at body temperature (36° C.+ or −1° C.) for 24 hours. Microbe concentrations were determined at time zero by analysis of control materials immediately after inoculation, and the study commenced only if the time zero concentration was at least about 100,000 cells/carrier. The experiments were performed in duplicates. After incubation, each stack of swatches was rinsed with Dey-Engley neutralizing broth, and remaining live bacteria were grown on tryptic soy agar at 36° C.+ or −1° C. for 24 to 48 hours. Cell colonies were counted on the agar, and reductions of microorganism concentrations were calculated relative to controls.

Fabric washed with the 1:128 dilution of formulation Laundry Sanitizer 2 displayed a >99.999967% (>6.36 $Log_{10}$) reduction in *Klebsiella pneumoniae* growth and a >99.96% (>3.40 $Log_{10}$) reduction in *Staphylococcus aureus* growth relative to untreated controls. Fabric washed with the 1:128 dilution of formulation Laundry Sanitizer 2 and then steam pressed displayed a >99.999967% (>6.36 $Log_{10}$) reduction in *Klebsiella pneumoniae* growth and a >99.96% (>3.40 $Log_{10}$) reduction in *Staphylococcus aureus* growth relative to untreated controls.

TABLE 12

Residual Efficacy Against *Klebsiella pneumoniae* in Fabric washed or steamed with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 149,000 | 143,000 | | |
|  |  | 2 | 138,000 | | | |
| 24 Hours | Control | 1 | 11,300,000 | 11,400,000 | | |
|  |  | 2 | 11,500,000 | | | |
|  | Washed 1:128 | 1 | <5 | <5 | >99.997% $Log_{10} > 4.46$ | >99.999967% $Log_{10} > 6.36$ |
|  |  | 2 | <5 | | | |
|  | Washed and Steam-Pressed 1:128 | 1 | <5 | <5 | >99.997% $Log_{10} > 4.46$ | >99.999967% $Log_{10} > 6.36$ |
|  |  | 2 | <5 | | | |

TABLE 13

Residual Efficacy Against *Staphylococcus aureus* in Fabric washed or steamed with a 1:128 dilution of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 84,500 | 94,300 | | |
|  |  | 2 | 104,000 | | | |
| 24 Hours | Control | 1 | 31,000 | 125,000 | | |
|  |  | 2 | 225,000 | | | |
|  | Washed 1:128 | 1 | <5 | <5 | >99.995% $Log_{10} > 4.28$ | >99.96% $Log_{10} > 3.40$ |
|  |  | 2 | <5 | | | |
|  | Washed and Steam-Pressed 1:128 | 1 | <5 | <5 | >99.995% $Log_{10} > 4.28$ | >99.96% $Log_{10} > 3.40$ |
|  |  | 2 | <5 | | | |

Example 6. Laundry Sanitizer and UNDER ARMOR® Fabric

UNDER ARMOR® fabric was washed using a 1:128 or 1:256 dilution of formulation "Laundry Sanitizer 2" of Example 1. The fabric was tested according to American Association of Textile Chemists and Colorists (AATCC) method 100 (AATCC 100) for residual activity against gram-negative bacteria *Klebsiella pneumoniae* growth and gram-positive bacteria *Staphylococcus aureus* growth. Briefly, bacteria were cultured in liquid tryptic soy broth media for 18 hours and then diluted with phosphate-buffered saline to a concentration of 200,000 CFU/mL. Fabric was cut into 4.8 cm diameter swatches and stacked at 4 swatches per stack, which was sufficient to absorb 1 mL liquid inoculum. Control and test materials were inoculated with 1 mL liquid inoculum and then incubated in a humid environment at body temperature (36° C.+ or −1° C.) for 24 hours. Microbe concentrations were determined at time zero by analysis of control materials immediately after inoculation, and the study commenced only if the time zero concentration was at least about 100,000 cells/carrier. The experiments were performed in duplicates. After incubation, each stack of swatches was rinsed with Dey-Engley neutralizing broth, and remaining live bacteria were grown on tryptic soy agar at 36° C.+ or −1° C. for 24 to 48 hours. Cell colonies were counted on the agar, and reductions of microorganism concentrations were calculated relative to controls.

Fabric washed with the 1:128 dilution of formulation Laundry Sanitizer 2 displayed a 99.995% (4.31 Logo) reduction in *Klebsiella pneumoniae* growth and a >99.992% (>4.12 $Log_{10}$) reduction in *Staphylococcus aureus* growth relative to untreated controls. Fabric treated with the 1:256 dilution of formulation Laundry Sanitizer 2 displayed a 99.0% (2.00 $Log_{10}$) reduction in *Klebsiella pneumoniae* growth and a >99.992% (>4.12 $Log_{10}$) reduction in *Staphylococcus aureus* growth relative to untreated controls.

TABLE 14

Residual Efficacy Against *Klebsiella pneumoniae* in UNDER ARMOR® Fabric washed with 1:128 or 1:256 dilutions of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 275,000 | 245,000 | | |
|  |  | 2 | 215,000 | | | |
| 24 Hours | Control | 1 | 5,400,000 | 4,800,000 | | |
|  |  | 2 | 4,200,000 | | | |

TABLE 14-continued

Residual Efficacy Against *Klebsiella pneumoniae* in UNDER ARMOR ® Fabric washed with 1:128 or 1:256 dilutions of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| | Treated 1:128 | 1 | 325 | 233 | 99.91% | 99.995% |
| | | 2 | 140 | | $Log_{10}$ 3.02 | $Log_{10}$ 4.31 |
| | Treated 1:256 | 1 | 49,000 | 47,800 | 80.51% | 99.0% |
| | | 2 | 46,500 | | $Log_{10}$ 0.71 | $Log_{10}$ 2.00 |

TABLE 15

Residual Efficacy Against *Staphylococcus aureus* in UNDER ARMOR ® Fabric washed with 1:128 or 1:256 dilutions of formulation Laundry Sanitizer 2

| Contact Time | Sample | Replicate | Replicate CFU/Carrier | Average CFU/Carrier | Reduction Relative to Time Zero Control | Reduction Relative to 24 Hour Control |
|---|---|---|---|---|---|---|
| Time Zero | Control | 1 | 135,000 | 153,000 | | |
| | | 2 | 170,000 | | | |
| 24 Hours | Control | 1 | 80,500 | 66,500 | | |
| | | 2 | 52,500 | | | |
| | Treated 1:128 | 1 | <5 | <5 | >99.997% | >99.992% |
| | | 2 | 5 | | $Log_{10}$ > 4.48 | $Log_{10}$ > 4.12 |
| | Treated 1:256 | 1 | <5 | <5 | >99.997% | >99.992% |
| | | 2 | 5 | | $Log_{10}$ > 4.48 | $Log_{10}$ > 4.12 |

Example 7. Efficacy of 1:10 Dilution of Drain Cleaner Against Gram-Positive and Gram-Negative Bacteria The efficacy of a 1:10 dilution of drain cleaner formulation 2A (described in Example 1) in water was assessed against gram-positive bacteria *Listeria monocytogenes* and gram-negative bacteria *Salmonella enterica* and *Escherichia coli* according to American Society for Testing and Materials (ASTM) protocol E2315 (ASTM E2315). Briefly, bacteria were cultured in liquid tryptic soy broth media for 18-24 hours and then diluted to a concentration of 100,000,000 CFU/mL. 1 mL of the 1:10 dilution of drain cleaner formulation 2A or phosphate-buffered saline (PBS) control was mixed with 0.2 mL inoculum at 25° C.+ or −2° C. for 5 minutes. 0.1 mL of each mixture was neutralized with modified Letheen broth, and remaining live bacteria were grown on tryptic soy agar at 36° C.+ or −1° C. for 24 to 48 hours. Cell colonies were counted on the agar, and reductions of microorganism concentrations were calculated relative to controls.

The 1:10 dilution of Drain Cleaner Formulation 2A in water displayed a >99.99998% (>6.64 $Log_{10}$) reduction in *Escherichia coli*, a >99.9999% (>5.95 $Log_{10}$) reduction in *Listeria monocytogenes*, and a >99.9998% (>5.63 $Log_{10}$) reduction in *Salmonella enterica*, relative to phosphate-buffered saline controls.

TABLE 16

Efficacy of 1:10 Dilution of Drain Cleaner Formulation 2A in Water Against *Escherichia coli*

| Contact Time | Sample | Replicate | Replicate CFU/mL | Average CFU/mL | Reduction Relative to Time Zero Control | Reduction Relative to 5 Minute Control |
|---|---|---|---|---|---|---|
| Time Zero | PBS Control | 1 | 255,000,000 | 263,000,000 | | |
| | | 2 | 270,000,000 | | | |
| 5 minutes | PBS Control | 1 | 190,000,000 | 220,000,000 | | |
| | | 2 | 250,000,000 | | | |
| | 1:10 dilution of Drain Cleaner 2A | 1 | <50 | <50 | >99.99998% | >99.99998% |
| | | 2 | <50 | | $Log_{10}$ > 6.72 | $Log_{10}$ > 6.64 |

TABLE 17

Efficacy of 1:10 Dilution of Drain Cleaner Formulation 2A in Water Against *Listeria monocytogenes*

| Contact Time | Sample | Replicate | Replicate CFU/mL | Average CFU/mL | Reduction Relative to Time Zero Control | Reduction Relative to 5 Minute Control |
|---|---|---|---|---|---|---|
| Time Zero | PBS Control | 1 | 60,000,000 | 45,000,000 | | |
| | | 2 | 30,000,000 | | | |
| 5 minutes | PBS Control | 1 | 50,000,000 | 45,000,000 | | |
| | | 2 | 40,000,000 | | | |
| | 1:10 dilution of Drain Cleaner 2A | 1 | <50 | <50 | >99.9999% $Log_{10} > 5.95$ | >99.9999% $Log_{10} > 5.95$ |
| | | 2 | <50 | | | |

TABLE 18

Efficacy of 1:10 Dilution of Drain Cleaner Formulation 2A in Water Against *Salmonella enterica*

| Contact Time | Sample | Replicate | Replicate CFU/mL | Average CFU/mL | Reduction Relative to Time Zero Control | Reduction Relative to 5 Minute Control |
|---|---|---|---|---|---|---|
| Time Zero | PBS Control | 1 | 120,000,000 | 160,000,000 | | |
| | | 2 | 200,000,000 | | | |
| 5 minutes | PBS Control | 1 | 190,000,000 | 160,000,000 | | |
| | | 2 | 130,000,000 | | | |
| | 1:10 dilution of Drain Cleaner 2A | 1 | <50 | <375 | >99.9998% $Log_{10} > 5.63$ | >99.9998% $Log_{10} > 5.63$ |
| | | 2 | 700 | | | |

Example 8. Efficacy of Drain Cleaner Against Fruit Flies

The efficacy of 1:1 dilutions of formulations Drain Cleaner 2-A and 2P-A (described in Example 1) in water were assessed against *Drosophila melanogaster* larvae. Briefly, 50 mL of each drain cleaner formulation or water as a control was poured through a 2-inch PVC pipe with mesh bottom lined with *Drosophila* breeding medium. The PVC pipe was then placed in a 9 ounce cup with a snap-on lid. Adult *Drosophila* emergence was quantified as a percentage of untreated controls.

Drain Cleaner 2-A significantly reduced adult *Drosophila* emergence relative to controls. The addition of the natural pesticide phenethyl priopionate to the formulation, i.e., Drain Cleaner 2P-A, further reduced adult *Drosophila* emergence relative to controls.

TABLE 19

Adult *Drosophila* Emergence as a Percentage of Untreated Controls for PVC Pipe Treated with Water, Drain Cleaner 2A, or Drain Cleaner 2P-A After Seven to Sixteen Days

| | Day | | | | | | | | | |
|---|---|---|---|---|---|---|---|---|---|---|
| | 7 | 8 | 9 | 10 | 11 | 12 | 13 | 14 | 15 | 16 |
| Water | 19% | 28% | 44% | 54% | 71% | 78% | 81% | 85% | 89% | 89% |
| DC-2 | 0% | 0% | 0% | 1% | 3% | 3% | 5% | 8% | 8% | 8% |
| DC-2P | 0% | 0% | 1% | 1% | 2% | 2% | 4% | 4% | 4% | 5% |

Example 9. Efficacy of Formulations Against *Pseudomonas aeruginosa* Biofilms The efficacy of 1:32 and 1:64 dilutions of the biofilm remover described in Example 1 in 300 PPM hard water was assessed against gram-negative *Pseudomonas aeruginosa* (ATCC 15442) bacterial biofilms using the American Society for Testing and Materials (ASTM) protocol E2871 (ASTM E2871). Briefly, *Pseudomonas aeruginosa* was grown in liquid tryptic soy broth media for 24 hours + or −2 hours in a batch-phase bioreactor containing suspended glass disk carriers under continuous stirring to seed *Pseudomonas aeruginosa*. The seeded disk carriers were then incubated under the continuous flow of diluted fresh media for 24 hours + or −2 hours, maintaining continuous stirring. The disk carriers were then placed in independent sterile vessels and contacted with 4 mL of 1:32 or 1:64 dilutions of the biofilm remover formulation described in Example 1 for 10 minutes at ambient temperature. The formulation was then neutralized with 36 mL of Dey-Engley neutralizing broth, and surviving bacteria were harvested by vortex and sonication. Surviving bacteria were quantified on agar plates grown at 36° C.+ or −1° C. for 48 hours + or −2 hours. The 1:32 dilution of the biofilm remover formulation decreased the number of viable cells in the *Pseudomonas aeruginosa* biofilm by >99.75% ($Log_{10}$ reduction of >2.60), and the 1:64 dilution decreased the number of viable cells by 99.998% ($Log_{10}$ reduction of 4.91).

TABLE 20

Efficacy of Biofilm Remover Against *Pseudomonas aeruginosa* biofilms

| Contact Time | Test Substance | Replicate | Replicate CFU/Carrier | Average CFU/Carrier | Reduction Relative to Time Zero Control |
|---|---|---|---|---|---|
| Time Zero | Control | 1 | 1,230,000,000 | 1,190,000,000 | |
| | | 2 | 1,000,000,000 | | |
| | | 3 | 1,320,000,000 | | |
| 10 minutes | BF-1 (1:32) | 1 | <20 | <3,000,000 | >99.75% |
| | | 2 | 100 | | $Log_{10}$ > 2.60 |
| | | 3 | 9,000,000 | | |
| | BF-1 (1:64) | 1 | 5,400 | 14,700 | 99.9988% |
| | | 2 | 800 | | $Log_{10}$ 4.91 |
| | | 3 | 38,000 | | |

Example 10. Efficacy of Multipurpose Cleaner Against Fungi *Dekkera bruxellensis*

The efficacy of 1:128 dilutions of multipurpose cleaner formulations NF14 and NF18 (described in Example 1) in water was assessed against fungi *Dekkera bruxellensis* according to American Society for Testing and Materials (ASTM) protocol E1153 (ASTM E1153). Briefly, *Dekkera bruxellensis* was grown on potato dextrose agar for 18-24 hours. Sterilized 1-inch square glass-slide carriers were inoculated with 20 µL of inoculum containing 1,000,000 CFU *Dekkera bruxellensis* (50,000.000 CFU/mL) and then dried in an incubator at 25° C.+ or −2° C. for 30 minutes. Carriers were then contacted with 5 mL of the 1:128 dilutions of multipurpose cleaner formulations NF14 or NF18 or phosphate-buffered saline control for 5 minutes at 25° C.+ or −2° C. and 45.00% humidity. The formulations were neutralized with 20 mL Dey-Engley neutralizing broth. Surviving cells were quantified on agar plates grown at 36° C.+ or −1° C. for 24 to 48 hours.

TABLE 21

Efficacy of Multipurpose Cleaner Against *Dekkera bruxellensis*

| Contact Time | Sample | Replicate | Replicate CFU/Carrier | Average CFU/Carrier | Reduction Relative to Time Zero Control | Reduction Relative to 5 Minute Control |
|---|---|---|---|---|---|---|
| Time Zero | Control | 1 | 2,600,000 | 2,400,000 | | |
| | | 2 | 2,200,000 | | | |
| 5 Minutes | Control | 1 | 1,300,000 | 1,250,000 | | |
| | | 2 | 1,200,000 | | | |
| | 1:128 dilution of NF14 | 1 | <10 | <5 | >99.9998% | >99.9996% |
| | | 2 | 10 | | $Log_{10}$ > 5.68 | $Log_{10}$ > 5.40 |
| | 1:128 dilution of NF18 | 1 | <10 | <5 | >99.9998% | >99.9996% |
| | | 2 | 10 | | $Log_{10}$ > 5.68 | $Log_{10}$ > 5.40 |

Example 11. Efficacy of Multipurpose Cleaner Against Norovirus

The efficacy of a 1:128 dilution of multipurpose cleaner formulation NF-MRP1 (described in Example 1) in water was assessed against feline calicivirus (ATCC VR-782) according to American Society for Testing and Materials (ASTM) protocol E1053 (ASTM E1053). Feline calicivirus is related to human noroviruses, and efficacy of a formulation against feline calicivirus is indicative of efficacy against human norovirus. Briefly, stock feline calicivirus was thawed, and 200 µL of the stock solution was used to inoculate sterile, 10-square-inch, glass, petri dishes with at least 10,000 infectious particles per petri dish. Inoculated petri dishes were dried at 25.5° C. at 38% relative humidity for 13 minutes under laminar flow. 2 mL of the 1:128 dilution of formulation NF-MRP1 was added to a petri dish, and the petri dish was then incubated at 24.8° C. for 2 minutes or 10 minutes at 47% relative humidity. Infectious virus titer was then quantified in Crandell-Rees Feline Kidney Cells (ATCC CCL-94) grown in 2% FBS EMEM media at 37° C. under 5% carbon dioxide for 7 days.

TABLE 22

Efficacy of Multipurpose Cleaner Against Norovirus

| Sample | Contact Time | $Log_{10}$ Infectious Units/Carrier | Reduction Relative to Time Zero Control | Reduction Relative to 10 Minute Control |
|---|---|---|---|---|
| Control | Time Zero | 708,000,000 | | |
|  | 10 minutes | 1,260,000,000 | | |
| NF-MRP1 | 2 minutes | 398,000 | 99.94% $Log_{10}$ 3.25 | 99.97% $Log_{10}$ 3.50 |
|  | 10 minutes | 70,800 | 99.990% $Log_{10}$ 4.00 | 99.994% $Log_{10}$ 4.25 |

Example 12. Efficacy of 1:19.3 Dilution of Multipurpose Cleaner Against Gram-Positive and Gram-Negative Bacteria The efficacy of a 1:19.3 dilution of Multipurpose Cleaner formulation NF-MRP-POD (described in Example 1) in water was assessed against gram-positive bacteria *Staphylococcus aureus* and gram-negative bacteria *Escherichia coli* according to American Society for Testing and Materials (ASTM) protocol E2315 (ASTM E2315). The NF-MRP-POD is 15%-strength NF-MRP2-V, and thus a 1:19.3 dilution of NF-MRP-POD corresponds to a 1:128 dilution of NF-MRP2-V.

Briefly, bacteria were cultured in liquid tryptic soy broth media for 18 hours and then diluted to a concentration of 100,000,000 CFU/mL. 5 mL of the 1:19.3 dilution of Multipurpose Cleaner formulation NF-MRP-POD or phosphate-buffered saline control was mixed with 0.1 mL inoculum at 25° C.+ or −2° C. for 2 minutes. 0.1 mL of each mixture was neutralized with 9.9 mL modified Letheen broth, and remaining live bacteria were grown on tryptic soy agar at 36° C.+ or −1° C. for 24 to 48 hours. Cell colonies were counted on the agar, and reductions of microorganism concentrations were calculated relative to controls.

The 1:19.3 dilution of Multipurpose Cleaner formulation NF-MRP-POD in water displayed a >99.9999% (>5.98 $Log_{10}$) reduction in *Staphylococcus aureus* and a >99.9999% (>5.98 $Log_{10}$) reduction in *Escherichia coli* relative to phosphate-buffered saline controls.

TABLE 23

Efficacy of 1:19.3 Dilution of Multipurpose Cleaner Formulation NF-MRP-POD in Water Against *Staphylococcus aureus*

| Contact Time | Sample | Replicate | Replicate CFU/mL | Average CFU/mL | Average Reduction Relative to Control |
|---|---|---|---|---|---|
| Time Zero | PBS Control | 1 | 120,000,000 | 120,000,000 | |
|  |  | 2 | 120,000,000 | | |
| 2 Minutes | 1:19.3 dilution of NF-MRP-POD | 1 | 200 | <125 | >99.9999% $Log_{10}$ > 5.98 |
|  |  | 2 | <50 | | |

TABLE 24

Efficacy of 1:19.3 Dilution of Multipurpose Cleaner Formulation NF-MRP-POD in Water Against *Escherichia coli*

| Contact Time | Sample | Replicate | Replicate CFU/mL | Average CFU/mL | Average Reduction Relative to Control |
|---|---|---|---|---|---|
| Time Zero | PBS Control | 1 | 190,000,000 | 163,000,000 | |
| | | 2 | 135,000,000 | | |
| 2 Minutes | 1:19.3 dilution of NF-MRP-POD | 1 | <50 | <50 | >99.99997% Log$_{10}$ > 6.51 |
| | | 2 | <50 | | |

Example 13. Efficacy of 1:128 Dilutions of Multipurpose Cleaners MRP1 and NF-E1-EF Against Gram-Positive and Gram-Negative Bacteria The efficacy of 1:128 dilutions of Multipurpose Cleaner formulations NF-MRP1 and NF-E1-EF (described in Example 1) in water were assessed against gram-positive bacteria *Staphylococcus aureus* and *Listeria monocytogenes* and gram-negative bacteria *Escherichia coli* according to American Society for Testing and Materials (ASTM) protocol E2315 (ASTM E2315). NF-MRP1 was diluted either in water or 300 ppm hard water. Briefly, bacteria were cultured in liquid tryptic soy broth media for 18 hours and then diluted to a concentration of 100,000,000 CFU/mL. 1 mL of the 1:128 dilutions of Multipurpose Cleaner formulation NF-MRP1 or NF-E1-EF or phosphate-buffered saline control were mixed with either 40-50 µL inoculum for *S. aureus* and *E. coli* or 150 µL inoculum for *L. monocytogenes* at 25° C.+ or −2° C. for either 30 seconds or 2 minutes. 0.1 mL of each *S. aureus* and *E. coli* mixture and 1.0 mL of each *L. monocytogenes* mixture was neutralized with 9.9 mL modified Letheen broth, and remaining live bacteria were grown on tryptic soy agar at 36° C.+ or −1° C. for 24 to 48 hours. Cell colonies were counted on the agar, and reductions of microorganism concentrations were calculated relative to controls.

TABLE 25

Efficacy of 1:128 Dilution of Multipurpose Cleaner Formulation NF-MRP1 in Water or 300 ppm Hard Water Against *Staphylococcus aureus*

| Contact Time | Sample | Replicate | Replicate CFU/mL | Average CFU/mL | Average Reduction Relative to Control |
|---|---|---|---|---|---|
| Time Zero | PBS Control | 1 | 103,000,000 | | |
| | | 2 | 81,500,000 | | |
| 2 Minutes | 1:128 dilution of NF-MRP1 in Water | 1 | <50 | <50 | >99.99995% Log$_{10}$ > 6.26 |
| | | 2 | <50 | | |
| | 1:128 dilution of NF-MRP1 in 300 ppm Hard Water | 1 | <50 | <50 | >99.99995% Log$_{10}$ > 6.26 |
| | | 2 | <50 | | |

TABLE 26

Efficacy of 1:128 Dilution of Multipurpose Cleaner Formulation NF-MRP1 in Water or 300 ppm Hard Water Against *Escherichia coli*

| Contact Time | Sample | Replicate | Replicate CFU/mL | Average CFU/mL | Average Reduction Relative to Control |
|---|---|---|---|---|---|
| Time Zero | PBS Control | 1 | 368,000,000 | 341,000,000 | |
| | | 2 | 313,000,000 | | |
| 2 Minutes | 1:128 dilution of NF-MRP1 in Water | 1 | <50 | <50 | >99.999985% Log$_{10}$ > 6.83 |
| | | 2 | <50 | | |
| | 1:128 dilution of NF-MRP1 in 300 ppm Hard Water | 1 | <50 | <50 | >99.999985% Log$_{10}$ > 6.83 |
| | | 2 | <50 | | |

TABLE 27

Efficacy of 1:128 Dilution of Multipurpose Cleaner Formulation NF-MRP1 in Water or 300 ppm Hard Water Against *Listeria monocytogenes*

| Contact Time | Sample | Replicate | Replicate CFU/mL | Average CFU/mL | Average Reduction Relative to Control |
|---|---|---|---|---|---|
| Time Zero | PBS Control | 1 | 45,000,000 | 42,500,000 | |
| | | 2 | 40,000,000 | | |
| 2 Minutes | 1:128 dilution of NF-MRP1 in Water | 1 | <50 | <50 | >99.99988% $Log_{10} > 5.93$ |
| | | 2 | <50 | | |
| | 1:128 dilution of NF-MRP1 in 300 ppm Hard Water | 1 | <50 | <50 | >99.99988% $Log_{10} > 5.93$ |
| | | 2 | <50 | | |

TABLE 28

Efficacy of 1:128 Dilution of Multipurpose Cleaner Formulation NF-E1-EF in Water Against *Staphylococcus aureus*

| Contact Time | Sample | Replicate | Replicate CFU/mL | Average CFU/mL | Average Reduction Relative to Control |
|---|---|---|---|---|---|
| Time Zero | PBS Control | 1 | 110,000,000 | 77,500,000 | |
| | | 2 | 45,000,000 | | |
| 30 Seconds | 1:256 dilution of NF-E1-EF in 500 ppm Hard Water | 1 | <50 | <50 | >99.99994% $Log_{10} > 6.19$ |
| | | 2 | <50 | | |

TABLE 29

Efficacy of 1:128 Dilution of Multipurpose Cleaner Formulation NF-E1-EF in Water Against *Escherichia coli*

| Contact Time | Sample | Replicate | Replicate CFU/mL | Average CFU/mL | Average Reduction Relative to Control |
|---|---|---|---|---|---|
| Time Zero | PBS Control | 1 | 450,000,000 | 545,000,000 | |
| | | 2 | 640,000,000 | | |
| 30 Seconds | 1:256 dilution of NF-E1-EF in 500 ppm Hard Water | 1 | 133,000,000 | 118,000,000 | 78.30% $Log_{10} = 0.66$ |
| | | 2 | 104,000,000 | | |

Example 14. Efficacy of Multipurpose Cleaner Against Norovirus

The efficacy of a 1:32 dilution of multipurpose cleaner formulation NF-E1-EF (described in Example 1) in 200+ or −10 ppm AOAC synthetic hard water was assessed against feline calicivirus (ATCC VR-782) according to American Society for Testing and Materials (ASTM) protocol E1053 (ASTM E1053). Feline calicivirus is related to human noroviruses, and efficacy of a formulation against feline calicivirus is indicative of efficacy against human norovirus. Briefly, stock feline calicivirus was thawed, and 200 µL of the stock solution was used to inoculate sterile, 15 mm glass, petri dishes with greater than 10,000 infectious particles per petri dish. Cytotoxicity controls were performed without virus. Inoculated petri dishes were dried at ambient conditions (~20-22° C. and ~30.5-41.7% relative humidity) under laminar flow until visibly dry (15-41 minutes). 2 mL of the 1:32 dilution of formulation NF-E1-EF or PBS control was added to a petri dish, and the petri dish was gently rotated to ensure complete coverage of the test substance over the entirety of the test surface. The petri dish was then incubated under ambient conditions (~20-22° C. and 30.5-41.2% relative humidity) for 9 minutes 55 seconds (+ or −5 seconds). The mixture was neutralized with 2 mL of 2% fetal bovine serum in Eagle's Minimum Essential Medium (EMEM) supplemented with antibiotics (100 µg/mL kanamycin sulfate, 100 U/mL penicillin G, 100 µg/mL streptomycin, and 0.25 µg/mL amphotericin B) for 15 minutes under ambient conditions. Virus was re-suspended with sterile cell scrapers, and the neutralized solution was promptly pipetted into pre-equilibrated Sephacryl (S-1000 SF) columns. Eluted virus was pelleted by centrifugation for 3-4 minutes at 600× g, and serial dilutions of purified virus were prepared. Infectious virus titer was then quantified in Crandell-Rees Feline Kidney Cells (ATCC CCL-94) grown in 2% FBS EMEM media at 37° C. under 5% carbon dioxide for 7 days. Experiments were performed in duplicate and repeated on different days using different lots of NF-E1-EF. The test substance NF-E1-EF displayed no cytotoxicity in control experiments.

High Performance Liquid Chromatography (HPLC) analysis confirmed that the NF-E1-EF concentrate formulation contained 24.3-25.9% citric acid (w/v; 22.3-23.4% citric acid w/w).

NF-E1-EF was found to meet the US Environmental Protection Agency (EPA) Product Performance Guideline for Disinfectants for Use on Hard Surfaces outlined in OCSPP 810.2200 when tested against Feline calicivirus, Strain F-9, ATCC VR-782 at a contact time of 9 minutes & 55 seconds ±5 seconds.

TABLE 30

Efficacy of Multipurpose Cleaner NF-E1-EF Lot 1 Against Norovirus

| Sample | Contact Time | Replicate | Replicate $Log_{10}$ Infectious Units/carrier | Average $Log_{10}$ Infectious Units/carrier | Reduction Relative Control |
|---|---|---|---|---|---|
| Control | Time Zero | 1 | 12,600 | 22,400 | |
| | | 2 | 39,800 | | |
| NF-E1-EF | 9 minutes 55 seconds | 1 | <10 | <10 | >99.94% $Log_{10}$ > 3.25 |
| | | 2 | <10 | | |

TABLE 31

Efficacy of Multipurpose Cleaner NF-E1-EF Lot 2 Against Norovirus

| Sample | Contact Time | Replicate | Replicate $Log_{10}$ Infectious Units/carrier | Average $Log_{10}$ Infectious Units/carrier | Reduction Relative Control |
|---|---|---|---|---|---|
| Control | Time Zero | 1 | 1,260,000 | 1,260,000 | |
| | | 2 | 1,260,000 | | |
| NF-E1-EF | 9 minutes 55 seconds | 1 | <12.6 | <12.6 | >99.99% $Log_{10}$ > 4.00 |
| | | 2 | <12.6 | | |

Example 15. Efficacy of Multipurpose Cleaner Against *Staphylococcus aureus*

The efficacy of a 1:32 dilution of Multipurpose Cleaner formulation NF-E1-EF (described in Example 1) in 200+ or –10 ppm AOAC synthetic hard water was assessed against *Staphylococcus aureus* in stainless steel containers. Briefly, bacteria were cultured in AOAC Synthetic Broth supplemented with 0.1% glucose for ~24 hours at ~36° C. The culture was diluted with AOAC Synthetic Broth at about 1:2.2 to 1:2.5 prior to use to reduce bacteria concentration to about 1-10 million cells per mL. Sterile, stainless steel, penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. The carriers were transferred into 100 mm test tubes containing 10 mL of the 1:32 dilution of Multipurpose Cleaner, the test tubes were gently swirled, and the carriers was incubated in the cleaner at ~20° C. for ~10 minutes. The carriers were then removed from the test tubes, tapped if necessary to remove excess cleaner, and then completely submerged in test tubes each containing 10 mL of 2× Dey-Engley Neutralizing Broth. The test tubes were shaken and then incubated for ~48 hours at ~36° C. Following incubation, the test tubes were sonicated for 1 minute in water. Bacteria recovered from the test tubes were serially diluted in sterile PBS, plated on Tryptic Soy Agar, and then incubated for ~46-47 hours at ~36° C. Bacteria were then enumerated on the agar.

The time zero controls displayed 7.27 to 8.27 million CFU *Staphylococcus aureus* per penicylinder carrier, and incubation controls to which Multipurpose Cleaner was not added displayed 4.23 to 6.91 million CFU *Staphylococcus aureus* per penicylinder carrier. 60 carriers were analyzed with three different lots of the 1:32 dilutions of NF-E1-EF (180 total). 57 of 60 carriers treated with the first lot of NF-E1-EF displayed complete kills. 58 of 60 carriers treated with the second lot of NF-E1-EF displayed complete kills. 59 of 60 carriers treated with the second lot of NF-E1-EF displayed complete kills.

The citric acid concentration of the NF-E1-EF concentrates was measured as 24.3-25.9% citric acid (w/v; 22.3-23.4% citric acid w/w).

NF-E1-EF was found to meet the US EPA OCSPP 810.2200 standard for disinfection success criteria when tested against *Staphylococcus aureus* ATCC 6538 at a contact time of 9 minutes and 55 seconds ±5 seconds and a test temperature of 20±1° C.

Example 16. Efficacy of Multipurpose Cleaner Against Methicillin Resistant *Staphylococcus aureus* (MRSA)

The efficacy of a 1:32 dilution of Multipurpose Cleaner formulation NF-E1-EF (described in Example 1) in 200+ or –10 ppm AOAC synthetic hard water was assessed against Methicillin resistant *Staphylococcus aureus* (MRSA; strain ATCC 33591) in stainless steel containers. Briefly, bacteria were cultured in liquid Tryptic Soy Broth media for ~24 hours at ~36° C. The culture was diluted with Tryptic Soy Broth at about 1:3000 prior to use to reduce bacteria concentration to about 10,000-100,000 cells per mL. Sterile, stainless steel, penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. 10 mL of the 1:32 dilution of Multipurpose Cleaner was added to the carriers, the containers were gently swirled, and the solution was incubated in the carriers at ~20° C. for 10 minutes. The Multipurpose Cleaner was then removed from the penicylinder carriers, and the carriers were completely submerged in test tubes each containing 10 mL of Letheen Broth supplemented with 0.3% sodium thiosulfate. The test tubes were shaken and then incubated for ~48 hours at ~36° C. Following incubation, the test tubes were sonicated for 1 minute in water. Bacteria recovered from the test tubes were serially diluted in sterile PBS, plated on Tryptic Soy Agar, and then incubated for ~46 hours at ~36° C. Bacteria were then enumerated on the agar.

The time zero control displayed 68,200 CFU Methicillin resistant Staphylococcus aureus (MRSA) per penicylinder carrier, and an incubation control to which Multipurpose Cleaner was not added displayed 72,300 CFU MRSA per penicylinder carrier. 10 carriers was analyzed with two different lots of the 1:32 dilutions of NF-E1-EF (20 total), and each carrier displayed a complete kill thereby displaying a $Log_{10}$ reduction in MRSA growth of >4.83 relative to the time zero control (>99.9985% reduction) and a $Log_{10}$ reduction in MRSA growth of >4.86 relative to the run control (>99.9986% reduction).

The citric acid concentration of the NF-E1-EF concentrates was measured as 25.5-25.9% citric acid (w/v; 23.0-23.4% citric acid w/w).

NF-E1-EF was found to meet the US EPA Product Performance Guidelines for Disinfectants for Use on Hard Surfaces outlined in OCSPP 810.2200.

Example 17. Efficacy of Multipurpose Cleaner Against Pseudomonas aeruginosa

The efficacy of a 1:32 dilution of Multipurpose Cleaner formulation NF-E1-EF (described in Example 1) in 200+ or −10 ppm AOAC synthetic hard water was assessed against Pseudomonas aeruginosa in stainless steel containers. Briefly, bacteria were cultured in AOAC Synthetic Broth supplemented with 0.1% glucose for ~24 hours at ~36° C. The culture was diluted with AOAC Synthetic Broth at about 1:2.5 to 1:3 prior to use to reduce bacteria concentration to about 1-10 million cells per mL. Sterile, stainless steel, penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. The carriers were transferred into 100 mm test tubes containing 10 mL of the 1:32 dilution of Multipurpose Cleaner, the test tubes were gently swirled, and the carriers was incubated in the cleaner at ~20° C. for ~10 minutes. The carriers were then removed from the test tubes, tapped if necessary to remove excess cleaner, and then completely submerged in test tubes each containing 10 mL of 2x Dey-Engley Neutralizing Broth. The test tubes were shaken and then incubated for ~48 hours at ~36° C. Following incubation, the test tubes were sonicated for 1 minute in water. Bacteria recovered from the test tubes were serially diluted in sterile PBS, plated on Tryptic Soy Agar, and then incubated for ~46-48 hours at ~36° C. Bacteria were then enumerated on the agar.

The time zero controls displayed 4.32 to 49.0 million CFU Pseudomonas aeruginosa per penicylinder carrier, and incubation controls to which Multipurpose Cleaner was not added displayed 4.45 to 24.5 million CFU Pseudomonas aeruginosa per penicylinder carrier. 60 carriers were analyzed with three different lots of the 1:32 dilutions of NF-E1-EF (180 total). 59 of 60 carriers treated with the first lot of NF-E1-EF displayed complete kills. 59 of 60 carriers treated with the second lot of NF-E1-EF displayed complete kills. 56 of 60 carriers treated with the second lot of NF-E1-EF displayed complete kills.

The citric acid concentration of the NF-E1-EF concentrates was measured as 24.3-25.9% citric acid (w/v; 22.3-23.4% citric acid w/w).

NF-E1-EF was found to meet the US EPA OCSPP 810.2200 standard for disinfection success criteria when tested against Pseudomonas aeruginosa ATCC 15442 at a contact time of 9 minutes and 55 seconds ±5 seconds and a test temperature of 20±1° C.

Example 18. Efficacy of Multipurpose Cleaner Against Escherichia coil

The efficacy of a 1:32 dilution of Multipurpose Cleaner formulation NF-E1-EF (described in Example 1) in 200+ or −10 ppm AOAC synthetic hard water was assessed against E. Coli in stainless steel containers. Briefly, bacteria were cultured in Tryptic Soy Broth for ~24 hours at ~36° C. The culture was diluted with Tryptic Soy Broth at about 1:25 prior to use to reduce bacteria concentration to about 10,000-100,000 cells per mL. Sterile, stainless steel penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. The carriers were transferred into test tubes containing 10 mL of the 1:32 dilution of Multipurpose Cleaner, the test tubes were gently swirled, and the carriers was incubated in the cleaner at ~20° C. for ~10 minutes. The carriers were then removed from the test tubes, tapped if necessary to remove excess cleaner, and then completely submerged in test tubes each containing 10 mL of 2x Dey-Engley Neutralizing Broth. The test tubes were shaken and then incubated for ~48 hours at ~36° C. Following incubation, the test tubes were sonicated for 1 minute in water. Bacteria recovered from the test tubes were serially diluted in sterile PBS, plated on Tryptic Soy Agar, and then incubated for ~47 hours at ~36° C. Bacteria were then enumerated on the agar.

The time zero controls displayed 34,100 CFU E. Coli per penicylinder carrier, and incubation controls to which Multipurpose Cleaner was not added displayed 194,000 CFU E. coli per penicylinder carrier. 10 carriers were analyzed with two different lots of the 1:32 dilutions of NF-E1-EF (20 total). NF-E1-EF displayed complete kills in all 20 assays thereby displaying a $Log_{10}$ reduction in E. Coli growth of >4.53 relative to the time zero control (>99.997% reduction) and a $Log_{10}$ reduction in E. Coli growth of >5.29 relative to the run control (>99.9995% reduction).

The citric acid concentration of the NF-E1-EF concentrates was measured as 25.5-25.9% citric acid (w/v; 23.0-23.4% citric acid w/w).

NF-E1-EF was found to meet the US EPA Product Performance Guidelines for Disinfectants for Use on Hard Surfaces outlined in OCSPP 810.2200.

Example 19. Efficacy of Multipurpose Cleaner Against *Klebsiella pneumoniae*

The efficacy of a 1:32 dilution of Multipurpose Cleaner formulation NF-E1-EF (described in Example 1) in 200+ or −10 ppm AOAC synthetic hard water was assessed against *Klebsiella pneumoniae* in stainless steel containers. Briefly, bacteria were cultured in Tryptic Soy Broth for ~24 hours at ~36° C. The culture was diluted with Tryptic Soy Broth at about 1:40 prior to use to reduce bacteria concentration to about 100,000 cells per mL. Sterile, stainless steel, penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. The carriers were transferred into test tubes containing 10 mL of the 1:32 dilution of Multipurpose Cleaner, the test tubes were gently swirled, and the carriers was incubated in the cleaner at ~20° C. for ~10 minutes. The carriers were then removed from the test tubes, tapped if necessary to remove excess cleaner, and then completely submerged in test tubes each containing 10 mL of 2× Dey-Engley Neutralizing Broth. The test tubes were shaken and then incubated for ~46 hours at ~36° C. Following incubation, the test tubes were sonicated for 1 minute in water. Bacteria recovered from the test tubes were serially diluted in sterile PBS, plated on Tryptic Soy Agar, and then incubated for −48 hours at −36° C. Bacteria were then enumerated on the agar.

The time zero controls displayed 149,000 CFU *Klebsiella pneumoniae* per penicylinder carrier, and incubation controls to which Multipurpose Cleaner was not added displayed 87,300 CFU *Klebsiella pneumoniae* per penicylinder carrier. 10 carriers were analyzed with two different lots of the 1:32 dilutions of NF-E1-EF (20 total). NF-E1-EF displayed complete kills in all 20 assays thereby displaying a $Log_{10}$ reduction in *Klebsiella pneumoniae* growth of >5.17 relative to the time zero control (>99.999% reduction) and a $Log_{10}$ reduction in *Klebsiella pneumoniae* growth of >4.94 relative to the run control (>99.9989% reduction).

The citric acid concentration of the NF-E1-EF concentrates was measured as 25.5-25.9% citric acid (w/v; 23.0-23.4% citric acid w/w).

NF-E1-EF was found to meet the US EPA OCSPP 810.2200 standard for disinfection success criteria when tested against *Klebsiella pneumoniae* (CRE) ATCC BAA-2146 at a contact time of 9 minutes and 55 seconds ±5 seconds and a test temperature of 20° C.±1° C.

Example 20. Efficacy of Multipurpose Cleaner Against *Acinetobacter baumannii*

The efficacy of a 1:32 dilution of Multipurpose Cleaner formulation NF-E1-EF (described in Example 1) in 200+ or −10 ppm AOAC synthetic hard water was assessed against *Acinetobacter baumannii* in stainless steel containers. Briefly, bacteria were cultured in Tryptic Soy Broth for ~24 hours at ~36° C. The culture was diluted with Tryptic Soy Broth at about 1:8 prior to use to reduce bacteria concentration to about 10,000-100,000 cells per mL. Sterile, stainless steel, penicylinder carriers (8 mm OD; 6 mm ID; 10 mm length, type 304) were completely submerged in bacteria culture and removed such that approximately 1 mL of culture remained in the carriers. The stainless steel carriers were allowed to stand for 15 minutes at room temperature. The culture was then aspirated out of the carriers, the carriers were tapped or shaken if needed to remove residual culture, and the carriers were placed on sterile, double-filter-paper-lined Petri dishes on end. The carriers were then incubated on the Petri dishes at ~36° C. for 40 minutes or until visibly dry. The carriers were transferred into test tubes containing 10 mL of the 1:32 dilution of Multipurpose Cleaner, the test tubes were gently swirled, and the carriers was incubated in the cleaner at ~20° C. for ~10 minutes. The carriers were then removed from the test tubes, tapped if necessary to remove excess cleaner, and then completely submerged in test tubes each containing 10 mL of Letheen Neutralizing Broth containing 0.3% sodium thiosulfate. The test tubes were shaken and then incubated for ~47-48 hours at ~36° C. Following incubation, the test tubes were sonicated for 1 minute in water. Bacteria recovered from the test tubes were serially diluted in sterile PBS, plated on Tryptic Soy Agar, and then incubated for ~48 hours at ~36° C. Bacteria were then enumerated on the agar.

The time zero controls displayed 45,500 CFU *Acinetobacter baumannii* per penicylinder carrier, and incubation controls to which Multipurpose Cleaner was not added displayed 37,700 CFU *Klebsiella pneumoniae* per penicylinder carrier. 10 carriers were analyzed with two different lots of the 1:32 dilutions of NF-E1-EF (20 total). NF-E1-EF displayed complete kills in all 20 assays thereby displaying a $Log_{10}$ reduction in *Acinetobacter baumannii* growth of >4.66 relative to the time zero control (>99.99% reduction) and a $Log_{10}$ reduction in *Acinerobacter baumannii* growth of >4.58 relative to the run control (>99.99% reduction).

The citric acid concentration of the NF-E1-EF concentrates was measured as 25.5-25.9% citric acid (w/v; 23.0-23.4% citric acid w/w).

NF-E1-EF was found to meet the US EPA OCSPP 810.2200 standard for disinfection success criteria when tested against *Acinetobacter baumannii* (MDR) ATCC BAA-1605 at a contact time of 9 minutes and 55 seconds±5 seconds and a test temperature of 20° C. 1° C.

Example 21. Commercial Test Use

The commercial use of the MRP1 formulation was assessed in a 120-bed skilled nursing facility by four environmental service cleaning (EVS) staff during a four-day period. A 1:128 dilution of the MRP1 concentrate was used to clean wood (wainscoting), metal (lockers), porcelain (sinks), plastic (cafeteria tables), rubber (baseboards), and laminate (overbed tables) after dispensing the dilution from spray bottles onto cotton wash cloth applicators. Dwell time of the cleaner was approximately 2 minutes. Other commercial cleaning products were used as controls.

A 1:128 dilution of the MRP1 concentrate was also used to clean floor surfaces including sheet vinyl, vinyl composite tile, and finished flooring using microfiber mops and an auto scrubber. Dwell time of the dilution was approximately 2 minutes, and residue did not require further removal. Other commercial cleaning products were used as controls.

The majority of EVS staff, nursing center residents, and visitors commented on the pleasant fragrance of the MRP1 formulation. All four EVS staff gave the MRP1 formulation a maximum effectiveness rating. All four EVS staff stated that they preferred the MRP1 formulation to commercial cleaning product controls. All four EVS staff gave the MRP1 formulation the highest effectiveness rating for floor surface applications. All four EVS staff stated that the MRP1 formulation outperformed the commercial cleaning product control, e.g., because the MRP1 formulation displayed a quicker drying time and improved enhancement of the floor finish.

Example 22. Summary of Efficacy Studies

The MRP1 formulation has displayed the following efficacy against pathogens in various experiments.

TABLE 32

Summary of Efficacy Results for the MRP1 Formulation

|  | Contact Time | Log Reduction | Percent Reduction |
|---|---|---|---|
| Gram Positive Bacteria | | | |
| *Staphylococcus aureus* | 30 min | >7.00 | >99.99999% |
| *Listeria monocytogenes* | 30 min | >6.26 | >99.9999% |
| Vancomycin Resistant *Enterococcus faecalis* (VRE) | 5 min | >7.41 | >99.99999% |
| Methicillin Resistant *Staphylococcus aureus* (MRSA) | 5 min | >6.13 | >99.9999% |
| *Clostridium difficile* | 15 min | 0.72 | >80.9% |
| Gram Negative Bacteria | | | |
| *Escherichia coli* | 30 min | >7.00 | >99.99999% |
| *Pseudomonas aeruginosa* | 60 min | >7.00 | >99.99999% |
| *Legionella pneumophilia* | 60 min | >6.00 | >99.9999% |
| *Acinetobacter baumannii* | 60 min | >6.00 | >99.9999% |
| *Stenotrophomonas maltophilia* | 60 min | >6.00 | >99.9999% |
| Carbapenem-Resistant *Enterobacter cloacae* (CRE) | 5 min | >7.43 | >99.99999% |
| *Enterobacter aerogenes* | 5 min | >5.34 | >99.999% |
| *Salmonella enterica* | 5 min | >5.63 | >99.999% |
| *Neisseria gonorrhoeae* | 5 min | >3.66 | >99.9% |
| Yeast/Mold | | | |
| *Candida albicans* | 15 min | >6.00 | >99.9999% |
| *Dekkera bruxellensis* | 5 min | >5.40 | >99.999% |
| Viruses | | | |
| Norovirus | 10 min | >4.25 | >99.99% |

EQUIVALENTS

Those skilled in the art will recognize, or be able to ascertain using no more than routine experimentation, numerous equivalents to the compositions and methods of use thereof described herein. Such equivalents are considered to be within the scope of this invention and are covered by the following claims. Those skilled in the art will also recognize that all combinations of embodiments described herein are within the scope of the invention.

The invention claimed is:

1. A method of chemically ablating biofilm, comprising contacting the biofilm with a mixture comprising a cleaning and disinfecting composition concentrate and water, wherein:
the cleaning and disinfecting composition concentrate comprises an organic acid, a fatty acid, a surfactant, an alcohol, and water;
the organic acid is selected from one or more of citric acid, acetic acid, ascorbic acid, fumaric acid, propionic acid, oxalic acid, lactic acid, malic acid, and benzoic acid;
the cleaning and disinfecting composition concentrate comprises the organic acid at a concentration of 15% to about 35% (w/v);
the fatty acid is selected from one or more saturated or unsaturated C6-C18 monocarboxylic acids;
the cleaning and disinfecting composition concentrate comprises the fatty acid at a concentration of about 1% to about 3% (w/v);
the surfactant is a lauryl sulfate;
the cleaning and disinfecting composition concentrate comprises the surfactant at a concentration of about 3% to about 35% (w/v);
the alcohol is selected from ethanol, isopropanol, and n-propanol;
the cleaning and disinfecting composition concentrate comprises the alcohol at a concentration of about 2% to about 10% (w/v);
the cleaning and disinfecting composition concentrate is essentially free of halogenated molecules;
the cleaning and disinfecting composition concentrate is essentially free of oxidizing agents other than hydrogen peroxide;
the pH of the cleaning and disinfecting composition concentrate is less than 6.0;
the mixture comprises the cleaning and disinfecting composition concentrate and water at a ratio of about 1:10 to about 1:128; and
the biofilm is a biofilm of at least one organism selected from the group consisting of *Pseudomonas aeruginosa, Escherichia coli, Listeria monocytogenes, Streptococcus, Staphylococcus aureus, Klebsiella pneumoniae, Acinetobacter baumannii, Salmonella enterica, Dekkera bruxellensis*, Vancomycin Resistant *Enterococcus faecalis* (VRE), *Clostridium difficile, Legionella pneumophilia, Stenotrophomonas maltophilia*, Carbapenem-Resistant *Enterobacter cloacae* (CRE), *Enterobacter aerogenes, Neisseria gonorrhoeae*, and *Candida albicans*.

2. The method of claim 1, wherein the cleaning and disinfecting composition concentrate comprises:
the organic acid at a concentration of about 28% to about 32% (w/v);

the surfactant at a concentration of about 10% to about 15% (w/v); and/or the alcohol at a concentration of about 5% to about 6% (w/v).

3. The method of claim 1, wherein the mixture comprises the cleaning and disinfecting composition concentrate and water at a ratio of about 1:32 to about 1:128.

4. The method of claim 1, wherein the biofilm is a *Pseudomonas aeruginosa* biofilm.

5. The method of claim 1, wherein the biofilm is an *Escherichia coli*, *Listeria monocytogenes*, or *Streptococcus* biofilm.

6. The method of claim 1, further comprising mixing the cleaning and disinfecting composition concentrate and water, thereby resulting in the mixture.

7. The method of claim 1, wherein the mixture displays at least 99.9% efficacy relative to a control mixture at killing *E. coli*, *S. aureus*, *Listeria*, and *Salmonella* bacterial biofilms as assessed by one or more American Society for Testing and Materials (ASTM) protocols selected from ASTM E1053, ASTM E1153, ASTM E2315, and ASTM E2871.

8. The method of claim 1, wherein:
the biofilm is a *Staphylococcus aureus* biofilm; and
the mixture reduces *Staphylococcus aureus* cell count by at least 99.9%, relative to a time zero control, upon contacting the *Staphylococcus aureus* with the mixture for 2 minutes or more, thereby displaying efficacy at killing gram-positive bacteria.

9. The method of claim 1, wherein:
the biofilm is a *Staphylococcus aureus* and an *Escherichia coli* biofilm; and
the mixture reduces *Staphylococcus aureus* cell count by at least 99.9%, relative to a time zero control, upon contacting the *Staphylococcus aureus* with the mixture for 30 seconds or more, thereby displaying efficacy at killing gram-positive bacteria; and
the mixture reduces *Escherichia coli* cell count by at least 99.9%, relative to a time zero control, upon contacting the *Escherichia coli* with the mixture for 30 seconds or more, thereby displaying efficacy at killing gram-negative bacteria.

10. A method of killing pathogens or microbes in a biofilm, comprising performing the method of claim 1, wherein:
the pathogens or microbes are selected from *Pseudomonas aeruginosa*, Vancomycin Resistant *Enterococcus faecalis* (VRE), *Clostridium difficile*, *Legionella pneumophilia*, *Acinetobacter baumannii*, *Stenotrophomonas maltophilia*, Carbapenem-Resistant *Enterobacter cloacae* (CRE), *Enterobacter aerogenes*, *Neisseria gonorrhoeae*, and *Candida albicans*; and
the method is effective at killing at least 99% of the pathogens or microbes in a biofilm.

11. The method of claim 1, wherein:
the biofilm is a *Escherichia Coli* biofilm; and
the mixture reduces *Escherichia Coli* cell count by at least 99.9%, relative to a time zero control, upon contacting the *Escherichia Coli* with the mixture for 2 minutes or more, thereby displaying efficacy at killing gram-negative bacteria.

12. The method of claim 1, wherein:
the biofilm is a *Klebsiella pneumoniae* biofilm; and
the mixture reduces *Klebsiella pneumoniae* cell count by at least 99.9%, relative to a time zero control, upon contacting the *Klebsiella pneumoniae* with the mixture for 10 minutes or more, thereby displaying efficacy at killing *Klebsiella pneumonia*.

13. The method of claim 1, wherein:
the biofilm is a *Acinetobacter baumannii* biofilm; and
the mixture reduces *Acinetobacter baumannii* cell count by at least 99.9%, relative to a time zero control, upon contacting the *Acinetobacter baumannii* with the mixture for 10 minutes or more, thereby displaying efficacy at killing *Acinetobacter baumannii*.

14. The method of claim 1, wherein:
the biofilm is a *Listeria monocytogenes* biofilm; and
the mixture reduces *Listeria monocytogenes* cell count by at least 99.9%, relative to a time zero control, upon contacting the *Listeria monocytogenes* with the mixture for 2 minutes or more, thereby displaying efficacy at killing *Listeria*.

15. The method of claim 1, wherein:
the biofilm is a *Salmonella enterica* biofilm; and
the mixture reduces *Salmonella enterica* cell count by at least 99.9%, relative to a time zero control, upon contacting the *Salmonella enterica* with the mixture for 5 minutes or more, thereby displaying efficacy at killing *Salmonella*.

16. The method of claim 1, wherein:
the biofilm is a *Dekkera bruxellensis* biofilm; and
the mixture reduces *Dekkera bruxellensis* cell count by at least 99.9%, relative to a time zero control, upon contacting the *Dekkera bruxellensis* with the mixture for 5 minutes or more, thereby displaying efficacy at killing fungi.

17. The method of claim 1, wherein:
the biofilm is a *Pseudomonas aeruginosa* biofilm; and
the mixture reduces *Pseudomonas aeruginosa* cell count by at least 99.75%, relative to a time zero control, upon contacting the *Pseudomonas aeruginosa* with the mixture for 10 minutes or more, thereby displaying efficacy against biofilms.

* * * * *